United States Patent
Dubrofsky et al.

(10) Patent No.: US 12,008,348 B2
(45) Date of Patent: Jun. 11, 2024

(54) SMART CONTRACT COMPILER

(71) Applicants: The Pairwyse Foundation, Grand Cayman (KY); Akiva Capital Holdings Inc., Aventura, FL (US)

(72) Inventors: Akiva Dubrofsky, Toronto (CA); Ashwin Tumne, Toronto (CA)

(*) Notice: Subject to any disclaimer, the term of this patent is extended or adjusted under 35 U.S.C. 154(b) by 0 days.

(21) Appl. No.: 18/312,943

(22) Filed: May 5, 2023

(65) Prior Publication Data
US 2023/0367566 A1 Nov. 16, 2023

(30) Foreign Application Priority Data
May 10, 2022 (SG) .......................... 10202204876V

(51) Int. Cl.
*G06F 8/40* (2018.01)
*G06F 8/41* (2018.01)

(52) U.S. Cl.
CPC .................................. *G06F 8/427* (2013.01)

(58) Field of Classification Search
CPC ...... G06F 8/425; G06F 8/433; G06F 9/45508; G06F 11/3604
See application file for complete search history.

(56) References Cited

U.S. PATENT DOCUMENTS

| | | | |
|---|---|---|---|
| 11,036,614 B1 * | 6/2021 | Huang | G06F 11/3608 |
| 2020/0301846 A1 | 9/2020 | Li | |

FOREIGN PATENT DOCUMENTS

| | | |
|---|---|---|
| CN | 110096338 A | 8/2019 |
| WO | 2020210076 A1 | 10/2020 |

OTHER PUBLICATIONS

DSLFIN, "Domain-Specific Languages for Financial Systems (DSLFIN)"; Mar. 6, 2021; https://www.dslfin.org/resources.html.
Digital Asset, "Realize the full economic value of a more interconnected world"; Printed on Sep. 15, 2021, https://daml.com/.
Openlaw, "Markup Language"; Sep. 24, 2020; https://docs.openlaw.io/markup-language/#variables.
Ethereum Stack Exchange, "Can a solidity compiler be written in solidity?"; Oct. 22, 2018; https://ethereum.stackexchange.com/questions/8363/can-a-solidity-compiler-be-written-in-solidity.
Christian, "Blockchain Businesses and self-improviing DAOs";Apr. 12, 2016; https://blog.slock.it/blockchain-businesses-and-self-improving-daos-e1510efe82de#.uelx7j28r.
Wikipedia, The Free Encyclopedia, "Bearer instrument"; Jun. 9, 2022; https://en.wikipedia.org/wiki/Bearer_instrument.
Deon Digital, "Solving the reconciliation challenge!"; Printed on Nov. 8, 2021; https://www.deondigital.com/.

(Continued)

*Primary Examiner* — Hanh Thi-Minh Bui
(74) *Attorney, Agent, or Firm* — Smart & Biggar LP

(57) ABSTRACT

A compiler method for a smart contract. The compiler method is deployed on a blockchain; hence, the compiler method is an on-chain compiler. The compiler method comprises receiving a byte sequence program for an object structure. The object structure includes at least one agreement condition. The compiler method further, maps the byte sequence program into at least one executable smart contract representation of the object structure executable by the blockchain.

17 Claims, 12 Drawing Sheets

(56) References Cited

OTHER PUBLICATIONS

Cardano, "Introduction: Designing in Layers—Cardano Settlement Layer"; Printed on May 26, 2022; https://why.cardano.org/en/introduction/designing-in-layers/.
Search Report and Written Opinion of Singaporean Application No. 10202204876V dated May 10, 2022.
Li T. et al., "ATOM: Architectural Support and Optimization Mechanism for Smart Contract Fast Update and Execution in Blockchain-Based IoT"; IEEE Internet of Things Journal, Aug. 23, 2021, vol. 9, No. 11, pp. 7959-7971, Sections I-V, Fig. 4-8, Table I.
Tateishi T. et al., "Automatic Smart Contract Generation using Controlled Natural Language and Template"; IBM Journal of Research Development, Feb. 20, 2019, vol. 63, pp. 6:1-6:12, Sections 1-5, Fig. 2-8.
English Translation of CN Publication No. CN110096338A.
First Examination Report of Singaporean Patent Application No. 10202204876V dated May 10, 2022.
Notice of Allowance of Singaporean Patent Application No. 10202204876V dated Jan. 6, 2023.

* cited by examiner

FIG 5B

| Program Step | Element | Opcode | Data Value | Byte Sequence | Solidity™ function |
|---|---|---|---|---|---|
| 1 | CONDITION | 0xe3 | | 0xe3 | require |
| 2 | < | 0x21 | | 0x21 | < |
| 3 | time | 0x4a | | 0x4a | block.timestamp |
| 4 | start | | 14698896 | 0x000000000000000000000000000000000000000000000000000000000E04990 | |
| 5 | TRANSACTION | 0xb6 | | 0xb6 | delegatecall |
| 6 | ASSET | 0x5f | | 0x5f | address |
| 7 | Erc20Token | | 0x6b175474e89094c44da98b954eedeac495271d0f | 0x6b175474e89094c44da98b954eedeac495271d0f | |
| 8 | ACTION | 0xb1 | | 0xb1 | |
| 9 | Deposit | 0xce | | 0xce | transferFrom |
| 10 | FROM | 0xa8 | | 0xa8 | |
| 11 | Borrower | | 0xefa910e8e5b1d796cf66a32bf93e06a7f94c5329 | 0xefa910e8e5b1d796cf66a32bf93e06a7f94c5329 | |
| 12 | TO | 0x7d | | 0x7d | |
| 13 | Lender | | 0xa7a2d45b25a052c44dce6a97ad3ce4d36b9d782c | 0xa7a2d45b25a052c44dce6a97ad3ce4d36b9d782c | |
| 14 | AMOUNT | 0xf1 | | 0xf1 | wei |
| 15 | X | | 100000 | 0x00000000000000000000000000000000000000000000000000000000000186A0 | |

564 →

0xe3214a000000000000000000000000000000000000000000000000000000000E04990b65f6b175474e89094c44da98b954eede
ac495271d0fb1cea8efa910e8e5b1d796cf66a32bf93e06a7f94c53297da7a2d45b25a052c44dce6a97ad3ce4d36b9d782c000000000
00000000000000000000000000000000000000000000000000186A0

SMART CONTRACT COMPILER

CROSS-REFERENCE

This application claims the benefit of priority to Singapore Patent Application Ser. No. 10202204876V entitled SMART CONTRACT COMPILER filed May 10, 2022, the entire contents of which are herein incorporated into the Detailed Description herein below.

TECHNICAL FIELD

Example embodiments relate to compilers, in particular methods and systems for smart contract compilers deployed on a blockchain.

BACKGROUND

Smart contracts are software to transfer value based on predetermined criteria, sometimes following business logic. A smart contract may automatically perform obligations of a contract, such as making payments once agreement conditions are met. Therefore, smart contracts are similar in concept to traditional contracts but are implemented in software. Using smart contracts, the obligations of the contracts may be automatically performed when agreement conditions are met, without third-party (or intermediary) involvement. Smart contracts need to be implemented in a language that is Turing complete, which is a computer science term for languages that can solve a given computation problem using a limited instruction set to solve the computation problem.

Recently, blockchain became an appealing platform for implementing smart contracts for reasons including immutability of the underlying ledger system, which is central to user trust; transparency of transactions, which is central to due diligence; traceability of transactions, which is central to auditability; and decentralization, which is central to fault tolerance and censorship-free operation. Blockchain technology provides appealing functionality that allows a decentralized system that is not controlled by an intermediary. Therefore, using a blockchain for smart contract relieves parties to a contract from being controlled by an intermediary. Such smart contracts are executed by blockchain nodes (also called validator nodes or simply nodes) communicating within a network. Nodes are computing devices. Several types of blockchains exist. One of them is Ethereum™, which is known for implementing smart contracts. The strong immutability combined with high transparency make Ethereum™ and similar blockchains highly effective transaction ledgers, giving rise to financial applications of these technologies. However, what makes smart contracts and blockchains effective for trusted ledger transactions does not necessarily make these technologies in their current form fully effective for execution of trusted agreements in the traditional sense of a contract amongst signatories for reasons expanded herein. For example, Ethereum™ and similar blockchains place strong restrictions on upgradability of smart contracts.

A smart contract is a programming code representing an agreement between parties with functions (e.g. obligations) which can be executed by a node in the blockchain network when agreement conditions are met. For example, an entity, such as a corporation, may implement a smart contract to distribute dividends to shareholders when agreement conditions are met. The agreement conditions could be if revenue is above a predefined threshold, money is transferred to shareholders. In such a scenario, no intermediaries are involved, and obligations can be instantly performed once revenue surpasses the threshold. While a financial example was explained, smart contracts can be applied in healthcare, real estate, insurance, and other industries.

Smart contracts need to be deployed on a blockchain, which could involve on-chain or off-chain approaches depending on the blockchain type and its network rules. For on-chain deployment, the smart contract's program code is stored within mined transaction blocks used to sequentially construct the blockchain. For successful smart contract execution, all participating nodes must have the same code to execute the code successfully; therefore, an on-chain deployment approach for the blockchain guarantees global consensus of transactions. In other words, the network uses a protocol to maintain consensus across all nodes, allowing nodes to maintain a shared state upon execution of a smart contract program. In addition, this consensus mechanism renders certain data stored on the blockchain immutable after being confirmed via the consensus mechanism. For the off-chain deployment approach, each node's owner decides if the code is to be installed on the node, and hash-based commitment is used for validation when executing a smart contract.

Smart contracts based on Ethereum are deployed using an on-chain approach. The on-chain approach imposes strict immutability of smart contract code once deployed. The programmability of the Ethereum blockchain is made possible in part by the Ethereum. Virtual Machine ("EVM") residing on every node in the network. The EVM, in-turn, constitutes a Turing machine that operates to execute the program code of smart contracts deployed on the Ethereum blockchain. Consequently, once a smart contract code is deployed, any changes to the contract would need to be made in all nodes for program consistency to hold. However, a problem then arises in that once the smart contract code is deployed, which includes agreement conditions implemented as one or more executable programs, no further changes can be made to the original code as the changes would violate blockchain immutability. On the other hand, just like any other contract, a traditional contract (non-smart contracts) may be changed (upgraded) throughout the contract's life. Agreement conditions may be added, removed, amended, etc. in response to changing preferences of the agreement signatories over time. Such changes are technically not possible once a smart contract is deployed.

For these reasons, under current blockchain technologies a new smart contract is deployed every time logical programmatic changes are required relative to an existing smart contract previously deployed on the blockchain. These deployments present a practical technical challenge, as such smart contracts require signatories to deprecate a previously trusted smart contract and migrate their interests and approvals to a new master smart contract with little on-chain checks and balances as to the integrity of the new agreement conditions relative to original conditions. In addition, in cases where the agreement smart contract is holding or controlling assets, that ownership and governance over the assets also requires their migration from the first smart contract to the new improved smart contract, which is a technical problem posing real risks of asset loss if the migration code has not been properly vetted. Furthermore, the opportunity for fraud and theft increase if the migration code has been developed or deployed off-chain. As such, the technical challenge of applying smart contracts towards traditional upgradeable agreements remains unsolved under the present state of smart contract compilation and deployment.

The immutability of blockchains with respect to how they manage smart contract code presents a technical roadblock to the use of smart contracts for creating traditional binding agreements between parties which are upgradeable over time. In the current state of smart contract technologies, agreement signatories must perform extensive technical and legal due diligence on a new full-length agreement contract each time an upgrade is required, even if the program code changes are perceptively minimal. The extensive due diligence is for several reasons: firstly, the smallest change in smart contract program code can have unintended global effects on how the smart contract behaves in mediating an agreement between parties. At least, these reasons make technical and operational due diligence lengthy and cumbersome even if the actual upgrade is intended to be of limited consequence. Secondly, current blockchain programming languages are not generally reflective of domain-specific language (e.g. legal and financial instruction sets). Thus, code due diligence does not necessarily equate to contractual due diligence. Third, financial contracts require absolute technical immutability (i.e. non-upgradeability) of the original agreement contract address otherwise asset custody and legal risks are introduced. Finally, the technical complexity of smart contract conditional logic can increase exponentially as the number of asset accounts and security interests within an agreement contract scale linearly. As such, this ballooning in hard coded logic will eventually breach hard and soft limits set by blockchain networks for smart contract storage, run-time execution, maximum block size, and computational cost, thereby creating risk of critical failure for the agreement smart contract, degraded trust of its signatories and potential financial losses or liabilities.

Smart contracts, which are codes, are implemented using a programming language. One programming language is Solidity™. Solidity™ is an object-oriented, high-level language that targets the EVM. Solidity™ is statically typed and supports inheritance, libraries and complex user-defined types. Solidity™ has a compiler stored on a user computing device that changes the high-level language of the smart contract into a byte sequence program (bytecode), executable by the EVM. The compilation is performed on the user's computing device. Therefore, smart contracts are coded in a programming language. This language (e.g. Solidity™) may be challenging to understand by laypersons who do not have coding knowledge, particularly for smart contract parties (also referred to as users) such as bankers and lawyers. As such, a Solidity™ program is a collection of code (functions of the code) and data (state) residing at a specific immutable address on the Ethereum blockchain.

Therefore, methods and systems for allowing laypersons to implement a smart contract and customize its logic are needed. Furthermore, such methods and systems should allow users to upgrade the agreement conditions of the smart contract after being deployed on the blockchain, using a programming syntax more reflective of the smart contract's domain of application. Finally, such methods and systems should additionally enable the deployment and/or upgrading of logic and conditions in a smart contract through a fully on-chain mechanism to maximize transparency, and by consequence, the auditability of agreement conditions along with traceability of interests among signatories to an agreement.

The aforementioned technical issues limit the application of current smart contract and blockchain art toward defining upgradeable binding agreements between parties. Based on the array of technical challenges posed by current smart contract technologies, a novel solution to the problem requires a technical implementation that invokes (a) immutable asset custody; (b) customizability of agreement conditions; (c) full transparency, traceability and auditability of agreement upgrades. Given the strong technical requirements of blockchains for chain immutability and transparency, the utilization of blockchains for general contracting between parties requires a novel technical solution for upgrading an existing smart contract's conditional and operational logic while maintaining the original smart contract and blockchain address as the singular binding agreement.

SUMMARY

Example embodiments relate to methods and systems for on-chain smart contract compilers that enable users to upgrade agreement conditions of the contract deployed on the blockchain. A smart contract compiler is a smart contract deployed on nodes of a blockchain. The smart contract compiler, in the nodes, receives input strings from client devices describing a smart contract clause, term, instruction, etc. (also referred to as a smart contract request), and processes the input strings into a smart contract executable representation on the blockchain for execution. The smart contract clause term, instruction, etc., can be terms of a traditional contract (e.g. perform an action when one or more conditions are satisfied, or details for allowances and obligations). If the blockchain is the Ethereum blockchain, then the execution can be performed by the EVM, which is in the nodes.

Example embodiments may include users such as laypersons, who lack smart contract programming knowledge, implementing a smart contract. Such users may input the input strings, which are formatted in a specific format and syntax. The input string may specify agreement conditions. The compilation of the input string is all performed in the nodes on the blockchain. In contrast, traditionally, nodes may not process the input strings into an executable smart contract representation.

An example embodiment of the smart contract compiler, in the nodes, comprises three modules, a parsing module, an interpreting module, and an encoding module. The parsing module receives the input strings and parses the input strings into object structures in a string format. The interpreting module maps the object structure into a byte sequence program. Further, the interpreting module enables the smart contract compiler to expand simple and intricate agreement conditions comprising multiple logical operations into simple sequential steps (segments) for evaluation and execution. The encoding module receives the byte sequence program from the interpreting module and maps the byte sequence program into executable smart contract representation. Using the encoding module, the smart contract compiler implements native programming language functions, such as Solidity™ primitive functions or primitive operations available for Solidity™, on blockchain for use instead of the Solidity™ native functions or native operations used by the Solidity™ compiler.

An example embodiment is a compiler method for a smart contract, the method comprising: by the smart contract deployed on a blockchain: receiving an input string having at least one agreement condition and at least one action; accepting the input string; parsing, using a parser, the input string into an object structure, wherein the object structure is in a string format; determining a byte sequence program for the object structure; mapping the byte sequence program into at least one executable smart contract representation of the object structure executable by the blockchain, wherein the at least one executable smart contract representation implements at least one function of a programming language, wherein in response to receiving a request for executing the at least one function of the programming language, the at least one executable smart contract representation for the at least one function is executed and the at least one action is performed; receiving a second input string for updating a segment of at least one of the agreement conditions; parsing, using the parser, the second input string into a second object structure comprising the segment; determining a second byte sequence program for the second object structure; and updating the byte sequence program with the second byte sequence program.

In an example of any of the above compiler methods, the segment is a segment of a function.

In an example of any of the above compiler methods, the at least one executable smart contract representation implements native functions or native operations.

In an example of any of the above compiler methods, the native functions or the native operations include: one or more binary comparators including at least one of equal, not equal, greater than or less than; one or more set operations including at least one of logical AND, logical OR, COUNT, or SUM; one or more compositional operators including at least one of plus, minus, multiplication, or division; or one or more loops including while-loops, for-loops, counters, if-statements, switch statements.

In an example of any of the above compiler methods, the at least one executable smart contract representation implements a data source function including at least one of logical TRUE, logical FALSE, or a read-only variable.

In an example of any of the above compiler methods, the object structure is a nested tree, each leaf of the nested tree being another object structure.

In an example of any of the above compiler methods, the input string is in a recursive data structure.

In an example of any of the above compiler methods, the accepting of the input string is based on a computing device or a user providing the input string having permission to provide the input string.

In an example of any of the above compiler methods, the recursive data structure is a domain-specific language.

In an example of any of the above compiler methods, the byte sequence program is an ordered sequence of bytecodes for executing the at least one agreement condition and the at least one action.

In an example of any of the above compiler methods, the compiler method further includes, by the smart contract deployed on the blockchain, evaluating the at least one executable smart contract representation in response to the at least one agreement condition being satisfied.

In an example of any of the above compiler methods, the at least one executable smart contract representation is executable by an Ethereum Virtual Machine (EVM) of the blockchain.

In an example of any of the above compiler methods, the receiving the second input string, the parsing the second input string, and the determining the second byte sequence program is performed by a master smart contract which is the smart contract deployed on the blockchain.

In an example of any of the above compiler methods, the updating of the byte sequence program is updated exclusive of any other segments and any other agreement conditions.

In an example of any of the above compiler methods, the second string input is for further updating an amount of at least one of the actions.

In an example of any of the above compiler methods, the second string input is for further updating one or more further segments of at least one of the agreement conditions.

In an example of any of the above compiler methods, the input string, the object structure, and the byte sequence program represent a workflow is an ordered sequence.

In an example of any of the above compiler methods, the compiler method further includes: sending, from a computing device to the smart contract on the blockchain, the second input string; receiving, from the smart contract on the blockchain by the computing device or another computing device, confirmation of execution of the at least one smart contract representation.

In an example of any of the above compiler methods, the receiving the second input string is performed after the mapping.

Another example embodiment is for a compiler method for a smart contract. The method is deployed on a blockchain and comprises receiving a byte sequence program for an object structure including at least one agreement condition. Further, the method comprises mapping the byte sequence program into at least one executable smart contract representation of the object structure executable by the blockchain.

In another example embodiment, the at least one executable smart contract representation implements at least one function of a programming language. In other example embodiments, in response to receiving a request for executing the at least one function of the programming language, the at least one executable smart contract representation for the at least one function is executed.

In another example embodiment, the programming language is one of Solidity™, Vyper™, Yup™, Python™, Rust™, Haskell™, JavaScript™, DAML™. In an example embodiment, the at least one executable smart contract representation implements native functions or native operations.

In another example embodiment, the native functions and operations include: binary comparators including at least one of equal, not equal, greater than or less than; set operations including at least one of logical AND, logical OR, COUNT, or SUM; compositional operators including at least one of plus, minus, multiplication, or division; and loops such as while-loops, for-loops, counters, if-statements, switch statements.

In another example embodiment, the at least one executable smart contract representation implements a data source function including at least one of logical TRUE, logical FALSE, or a read-only variable.

In another example embodiment, the compiler method further comprises parsing, using a parser, an input string into an object structure comprising the at least one agreement condition, wherein the input string has the at least one agreement condition in a string format. The parsing is performed by the smart contract deployed on the blockchain.

In another example embodiment, the compiler method further comprises accepting the input string before the parsing of the input string into the object structure of the input string. In an example embodiment, the object structure is a nested tree, each leaf of the nested tree being another object structure.

In an example embodiment, the input string is in a recursive data structure. In another example embodiment, the input string is for a financial smart contract request. In another example embodiment, the accepting of the input string is based on a user providing the input string having permission to provide the input string. In another example embodiment, the recursive data structure is a domain-specific language.

In an example embodiment, the financial smart contract request includes a balance for an entity. In another example embodiment, the input string further comprises at least one of a signatory, a transaction type, an action, an amount, or an asset.

In another example embodiment, the input string represents an entry of a balance sheet wherein upon satisfying the at least one agreement condition, at least one of the following is performed: collateral deposit, lender deposit, loan principal interest payment, borrower collateral, borrower coupon, borrower principal, insurance premiums, administrative fee, investor principal investor yield, principal guarantor, rate guarantor, yield guarantor, foreign exchange guarantor, securities placement, securities underwriting or securities brokerage.

In an example embodiment, the signatory is a borrower or a lender. In another example embodiment, the transaction type is an obligation or an allowance. In another example embodiment, the action is making a deposit or a payment. In another example embodiment, the asset is one of a collateral deposit, a lender deposit, a loan principal, an interest payment, an insurance premium, and an administrative fee.

In an example embodiment, the compiler method further comprises mapping, in an interpreter, an object structure into the byte sequence program of the object structure. The byte sequence program is an ordered sequence of bytecodes for executing the at least one agreement condition. The mapping is performed by the smart contract deployed on the blockchain.

In an example embodiment, the compiler method further comprises evaluating the at least one executable smart contract representation in response to the at least one agreement condition being satisfied. The evaluating is performed by the smart contract deployed on the blockchain.

In an example embodiment, the compiler method further comprises receiving oracle data for evaluating the at least one agreement condition. In an example embodiment, the compiler method further comprises updating the byte sequence program by receiving another input string comprising another at least one agreement condition for the smart contract.

In an example embodiment, the at least one executable smart contract representation is executable by an Ethereum Virtual Machine (EVM) of the blockchain.

An example embodiment is for another compiler method for a smart contract. The compiler method is deployed on a blockchain and comprises receiving an input string having at least one agreement condition. Further, the method comprises parsing the input string into an object structure, wherein the object structure is in a string format. Also, the method includes determining a byte sequence program for the object structure and mapping the byte sequence program into at least one executable smart contract representation of the object structure executable by the blockchain.

An example embodiment is for another compiler method for a smart contract. While the smart contract is deployed on a blockchain in which the smart contract is configured to i) parse an input string into an object structure, wherein the object structure is in a string format, ii) determine a byte sequence program for the object structure; and iii) map the byte sequence program into at least one executable smart contract representation of the object structure executable by the blockchain, the method comprises sending, from a computing device, an input string having at least one agreement condition. Further, the method comprises receiving, by the computing device or another computing device, confirmation of execution of the at least one smart contract representation.

An example embodiment is for another compiler method for a smart contract. While the smart contract is deployed on a blockchain in which the smart contract is configured to i) parse an input string into an object structure, wherein the object structure is in a string format, ii) determine a byte sequence program for the object structure; and iii) map the byte sequence program into at least one executable smart contract representation of the object structure executable by the blockchain, the method comprises generating, by nodes on the blockchain, one or more indexes mapping processing-steps for processing the input string into the at least one executable smart contract representation. In another example embodiment, the one or more indexes are immutable.

In another example embodiment, the method further comprises generating, by the nodes on the blockchain, a unique hash key representing a blockchain address of the at least one smart contract representation of a pending balance sheet entry as a blockchain executable program. In another example embodiment, the unique hash key is immutable.

Example embodiments are for a compiler system for a smart contract. The system comprises a processor and a memory storing instructions which, when executed by the processor, cause the system to perform the any one of the methods or compiler methods described above.

Another example embodiment is computer-readable medium having tangibly stored thereon computer-executable instructions that, in response to execution by a processor, cause a smart contract of the processor deployed on a blockchain to perform any one of the methods or compiler methods described above.

BRIEF DESCRIPTION OF THE DRAWINGS

FIG. 5B is a schematic describing the opcode mapping and byte sequence program construction in the interpretation module based on the object structure in FIG. 5A.

Similar reference numerals may have been used in different figures to denote similar components.

DETAILED DESCRIPTION

Figure 1:
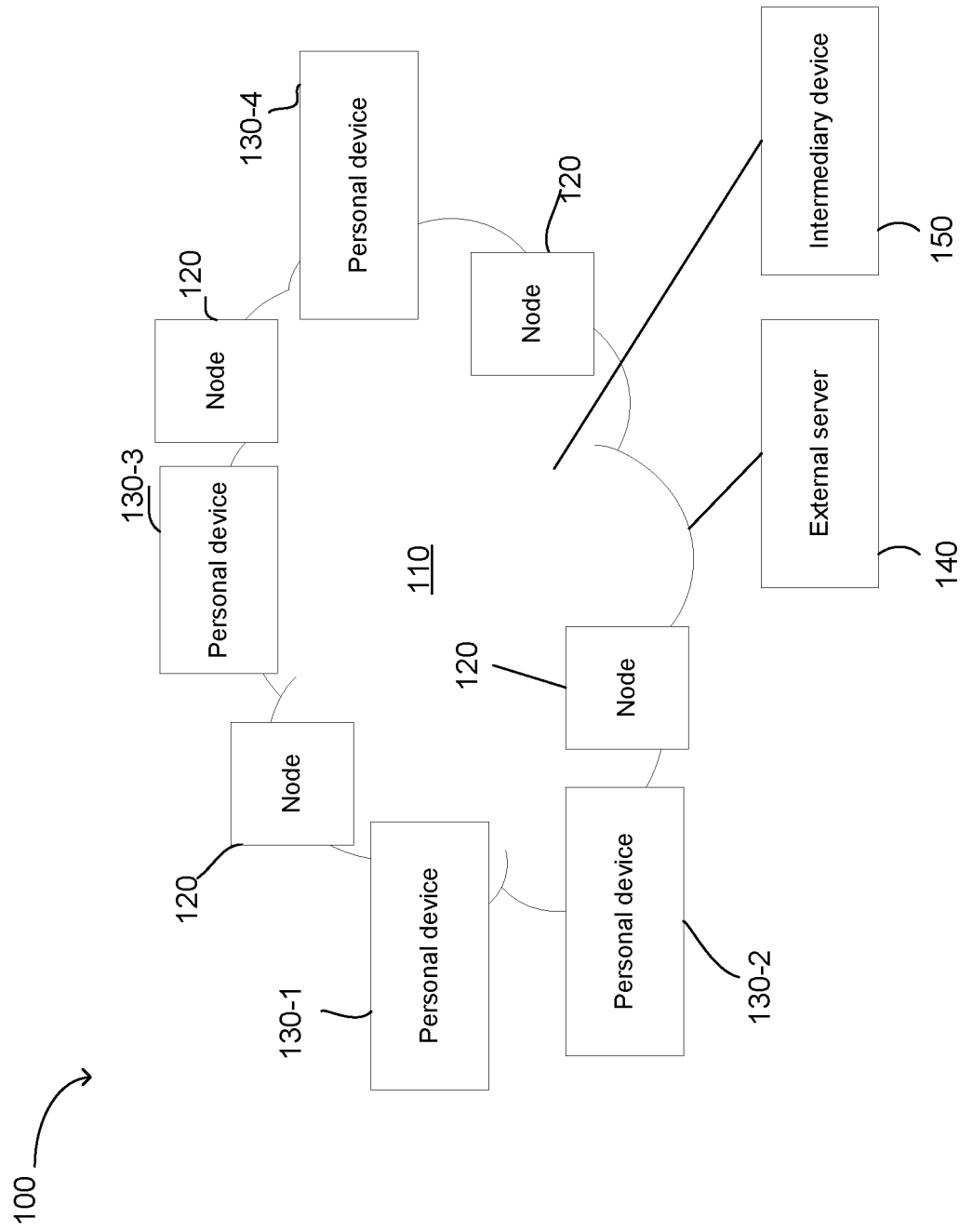
FIG. 1 is a schematic block diagram of a system in accordance with at least some example embodiments.

A smart contract compiler is a smart contract, which is a particular type of software program. Generally, a smart contract is programmed to apply or enforce a set of rules or conditions (e.g. agreement conditions). These rules or conditions may depend on extrinsic factors, such as data from external sources (e.g., a web server, a third-party device, etc.). For example, in at least some smart contracts, the program code may be triggered by input from external resources causing the smart contract to execute at least one subroutine. The subroutine implements some functions that need to be performed upon meeting agreement conditions. At least one subroutine may, for example, query a server, obtain response data, and then carry out some further action (e.g., "enforce" certain agreement conditions of the smart contract) according to the smart contract's program code.

In at least some embodiments, the smart contract may be implemented using a blockchain or distributed ledger system, such as the Ethereum blockchain developed by the Ethereum Foundation. In some alternative embodiments, a smart contract may be implemented without a blockchain or distributed ledger system. However, when deployed to a blockchain, smart contracts are deployed to nodes, which are computing devices connected to each other to ensure global consensus for the blockchain's ledger system. For on-chain deployment, each node has a copy of the smart contract, which is programming code. However, for off-chain deployment, each node owner decides if the smart contract code is to be installed on the node. A cryptographic-based hash commitment is used as reference for validating the integrity of the code.

Operation of the Ethereum blockchain can be modelled as a series of state transitions for a plurality of "accounts". Accordingly, the Ethereum blockchain, via execution of EVMs at each node, tracks the state of every account. State transitions on the Ethereum blockchain can be considered as transfers of information by and/or between accounts. There are two primary types of accounts: Externally Owned Accounts (EOAs), which are controlled by private cryptographic keys; and Contract Accounts, which are controlled by smart contract code, and may be "activated" or "triggered" by an EOA or, more particularly, when a transaction occurs that causes the Contract Account to activate and perform an operation. Both types of accounts have an address associated therewith, which may be represented as a hexadecimal string (e.g., 0xbfb2e296d9cf3e593a79981235aed29aa9984c0f). This address can be used to access all transaction data associated with the account, including asset balances held by an EOA or Contract Account.

The contract address is unique and used to access the Contract Account and invoke actions by the Contract's code on the blockchain network. The smart contract has agreement conditions fixed upon blockchain deployment and cannot be changed. Traditionally, if agreement conditions change, a new smart contract with a new address with the desired agreement conditions must be deployed on the blockchain. Therefore, deploying a new smart contract poses a restrictive technical problem for Contract Accounts holding a balance sheet of assets and liabilities, as expensive and time-consuming technical due diligence audits are required each time a new agreement is deployed. In addition, a migration of assets and liabilities from the old agreement to the new contract address needs to be made. This migration leaves a new agreement contract vulnerable to hacking, software bugs and coding blind spots that can result in permanent theft or loss of assets and security interests. Thus, a technical solution to this problem where only a portion of an agreement's condition is updated on-chain without changing the original contract code or address is desirable.

While the embodiments are described herein with reference to the Ethereum blockchain, the described embodiments may also be implemented using other blockchain or distributed ledger systems. In some cases, the described embodiments may also be implemented using a centralized approach. Therefore, it would be understood that using Solidity™, EVM, or Ethereum blockchain is not a limitation and is discussed as an example for implementing a smart contract compiler on a blockchain. Other blockchains may be used with respective virtual machines or alternatives to virtual machines. Also, programming languages other than Solidity™ may be used for the smart contract compiler.

Smart contracts are usually programmed in a high-level Turing complete programming language, one of which is Solidity™. Solidity™ uses an off-chain compiler that translates the high-level programming language into a byte sequence program (interchangeably bytecode) executable by the EVM. The byte sequence program is a low-level language specification not usually understandable by human beings. Nor is a byte sequence program immediately interpretable from an operational, financial, legal or business perspective even by experts possessing a skillset in low-level machine or assembly languages without context engrained in higher-level programming code. The byte sequence program is a compact hexadecimal representation of the smart contract that is written in a high-level language. Therefore, generally, the byte sequence program of the smart contract is deployed to the blockchain for on-chain execution. The high-level programming language, e.g. the smart contract written in Solidity", can also be converted into low-level yet human-readable instructions called operation code (opcode), which can be stacked to create the byte sequence program. Opcodes are of a higher level than their respective byte sequence programs. For instance, the following code is written in Solidity™:

contract MyContract {
    uint i=10+2*2;
}

For example, this code is an example smart contract named "MyContract" that assigns the value of 10+2*2 into an unsigned integer variable i. The byte sequence program for this Solidity™ smart contract may be [0x606060405260186000553415601357600080fd5b5b603 68060216000396000f3006060604052 5b600080fd00a165627a7a7230582012c9bd00152fa1 c480f6827f81515bbl9c3e63bf7ed9ffbb5fd a0265983ac7980029], which is a hexadecimal representation of the high-level programming language. The respective opcode for this hexadecimal representation may be [PUSH1 0x60 PUSH1 0x40 MSTORE PUSH1 0x18 PUSH1 0x0 SSTORE CALLVALUE ISZERO PUSH1 0x13 JUMPI PUSH1 0x0 DUP1 REVERT . . . ].

The EVM is a stack machine representing the operations performed in a sequence. For example, to perform the 10+2*2, the EVM understands to perform the multiplication then addition, e.g. 2*2 then add the sum to 10. The Solidity™ compiler expands the operations and puts the operation in a sequence for the EVM to execute. Therefore, the stack of EVM may be in the following order 2 2*10+, which means push 2 to the stack, push another 2 to the stack, perform multiplication and store the result, push 10 to the stack, and sum the 10 with the stored multiplication value. Each of these steps is translated into respective hexadecimal representations. Stacking each opcode's hexadecimal representation into hexadecimal sequences represents the byte sequence program. For instance, the hexadecimal representation for the command PUSH1 is 0)(60. The hexadecimal representation for MSTORE is 0x52, etc. Therefore, any change in the sequence of opcodes results in a different byte sequence program, and thus the EVM would execute another smart contract.

Traditionally, the above-discussed steps of converting from a high-level language understandable by humans into opcode and byte sequence program are performed by the Solidity™ compiler off-chain, typically on a user's computing device. Then, the byte sequence program is deployed to the blockchain for execution on-chain. Due to the immutability of blockchain transactions, no changes can be made once the byte sequence code is deployed, unless the smart contract is equipped with a novel ability to upgrade the smart contract's conditional logic without sacrificing immutability. Any change requires deploying another smart contract since the changes would result into a different byte sequence code.

In addition, only the on-chain byte sequence program is transparent to all users of the blockchain, while transparency for the high-level smart contract code only occurs if a user chooses to publish the smart contract code on a publically available internet server separate from the blockchain. In such instances, reconciliation of the high-level code with the low-level byte sequence program only occurs off-chain. Due to technical and financial risks that upgradeable agreement conditions pose, a fully transparent mapping between high-level human-readable language and low-level machine-interpreted byte code that is visible and verifiable completely on-chain would be a more desirable solution.

To create the solution described above, instead of implementing the smart contract in a high-level language such as Solidity™, example embodiments herein include converting, on-chain, input strings in a human-understandable language into a blockchain executable smart contract representation. In other words, example embodiments may include methods for compilation on-chain by a smart contract compiler in nodes rather than compiling on a computing device off-chain and then deploying the byte sequence program to nodes on the blockchain. For example, the input strings may contain agreement conditions. Another input string may be inputted to the smart contract compiler to add, remove, or change agreement conditions. Using the smart contract compiler as described herein can offer immutability, transparency, and upgradability required for updating agreement conditions of an existing agreement smart contract, especially in maintaining the integrity of assets and liabilities registered for the existing agreement smart contract address on the blockchain.

The smart contract compiler generates an immutable smart contract in that changes are reflected on all nodes, so practically, the smart contract cannot be spoofed as blockchain's immutability mechanism prevents any node from changing the code after its deployment on all nodes. The generated smart contract is also transparent in that changes by other input strings are visible. Further, the generated smart contract is upgradable in that input strings with different conditions may be inputted into the smart contract compiler and reflected into the smart contract. Further, the smart contract compiler, which is a smart contract, can be placed under control of a master smart contract for the smart contract compiler's execution. If the master smart contract represents the original agreement contract amongst one or more blockchain accounts and the smart contract compiler represents agreement conditions, then the original agreement contract is transformed into an immutable, transparent and upgradeable fully on-chain agreement.

Traditionally, smart contract users (or parties to the contract) may need to contract a developer knowledgeable in Solidity™ and describe what is desired to be achieved by the smart contract. The developer would then program the smart contract in a programming language. Any future changes to the contract would require another contract to be deployed. In contrast, the smart contract compiler allows users to input human-understandable input strings from client devices to generate the smart contract in nodes. The input strings are much more manageable and can be made much more simpler than programming smart contracts in Solidity™. Further, the users can upgrade the agreement conditions without developing another smart contract and without requiring any migration of assets or creditor interests from one smart contract to another.

FIG. 1 is a schematic block diagram of an example system in accordance with at least some embodiments. System 100 has a network 110, one or more nodes 120 that communicate via network 110, and one or more client devices 130-1, 130-2, 130-3, and 130-4 (each or collectively referred to as 130). The nodes 120 can also be called blockchain nodes. All nodes 120 have a copy of the smart contract code, in the case of the on-chain smart contract, or a hash-based commitment in the case of the off-chain smart contract. The nodes 120 collectively, along with other components (not shown) make a blockchain. The other components include blocks, which are data structures for recording an immutable set of validated transactions. The blocks are distributed to all nodes in the network. A chain, another component, keeps the blocks in a specific order. Miners are a specific type of nodes that perform block verification process, and consensus, which is a set of rules that carry out the blockchain operations.

The client devices 130 may be considered off-chain devices that can interact with each other by channeling private keys. Once the private keys are channeled, the client devices 130 can perform transactions off the chain until an agreement is reached, at which the client devices 130 connect to nodes 120 to record the agreement on-chain, which is reflected on the distributed ledger on all nodes 120. Therefore, the client devices 130 may not be a component of the blockchain whose components are discussed above.

The nodes 120 can initiate and receive transactions as well as validate the transaction to ensure consensus. The client devices 130 can only send and receive transactions; therefore, the client devices are usually used by parties to the smart contract.

Network 110 is a data communications network, such as the Internet, which enables data communication among elements of network 110 via one or more network communication protocols (e.g. TCP/IP) and interfaces which can be wired interfaces (e.g. Ethernet) or wireless (e.g. WiFi). The network 110 can include a plurality of networks. In some cases, various data communications among one or more elements of network 110 may be encrypted or tunnelled via virtual private networks. In some cases, network 110 may be a private network or a combination of public and private networks.

The nodes 120 and the client devices 130 are computing devices in data communication with network 110. An example of the node computing device of a node 120 is described in detail in FIG. 2. In at least some embodiments, each node 120 is configured to act as a blockchain node by executing a blockchain node software application. For example, node 120 may be an Ethereum blockchain node and may be configured to execute the EVM and to participate in the Ethereum blockchain peer-to-peer network. However, in some alternative embodiments, one or more nodes 120 may be a conventional server computer, which serves as a gateway to a centralized system.

Each node 120 or client device 130 may be a personal computer, server computer, tablet computer, smartphone, or other computing device. For example, for financial smart contract requests, the client device 130-1 and client device 130-2 may belong to borrowers and client device 130-3 or client device 130-4 may belong to lenders. Both borrowers and lenders are parties to a smart contract deployed on the blockchain. Each client device 130 connects to nodes 120 of the blockchain to initiate transactions and other actions and receive notifications of those transactions' results (e.g., the current blockchain state) as described further herein.

The external server 140 is a server, which is a computing device, that may or may not participate in the blockchain. However, external server 140 may be queried by nodes 120 to respond to some inquiries. For example, external server 140 may serve as an agreed-upon "oracle" for certain data in some embodiments, such as prevailing interest rates. Oracle can be software or hardware; for instance, the oracle can be an RFID sensor in cargo that signals arrival to a specific location or software with access to databases that include data such as interest rate changes, time, etc. In some examples, the external server 140 includes a cloud server or a cloud service. In some examples, the external device 140 may act as an autonomous machine agent, configured with secured private key credentials to access particular externally-owned accounts (EOAs) on a blockchain and optionally perform blockchain transactions on behalf of these accounts through blockchain transaction requests to nodes 120.

Intermediary device 150 is at least one computing device, such as a personal computer, server computer, tablet computer, smartphone, cloud server or other computing devices, which may be operated by an intermediary entity, a custodial entity, or both. In example embodiments, the intermediary device 150 connects a user, such as a borrower or a lender, to the external server 140 to enable the user to access resources and perform operations of the external server 140. In example embodiments, the intermediary device 150 can act as the autonomous machine agent. In some examples, external device 140 may push off-chain data points or data streams from an external server 140 to nodes 120 for on-chain registration or recording of the external data. In some examples, external device 140 may be mounted on the same physical hardware or private network as the intermediary device 150. In some examples, the external device 140 may perform off-chain audits of blockchain data via block or smart contract data queries to nodes 120. In some examples, external device 140 may invoke a private fork of an active public blockchain at a given block number or time stamp by making iterative queries to nodes 120 in order to simulate or model the behavior of one or more smart contracts deployed on the blockchain. In some examples, external device 140 may trigger a combination of on-chain and off-chain processes via communication with nodes 120 as part of a blockchain or smart contract audit or quality control workflow. In example embodiments, the intermediary device 150 may perform the above-mentioned operations of the external server 140.

Each of the nodes 120, client devices 130, external server 140, and intermediary device 150 may be coupled to or configured for communication with the network 110 through a wired or wireless connection. Although only a small number of computing devices are shown in FIG. 1 so as not to obscure the illustrated example embodiment, in some other embodiments, there may be a larger plurality of computing devices and, in particular, nodes 120 and client devices 130.

In example embodiments, a user inputs a smart contract request using a client device 130. For instance, a borrower user of a client device 130-1 or a client device 130-2 may send the smart contract request to nodes 120 to make a deposit of collateral that is worth a pre-specified amount of currency value in return of a loan. In another example, a borrower user of a client device 130-1 or client device 130-2 may send a smart contract request to node 120 for paying principal and interest at specified dates. In example embodiment, a lender user of a client device 130-3 or a client device 130-4 may withdraw principal and interest income by sending a smart contract request to node 120 at a specified date.

Figure 2:
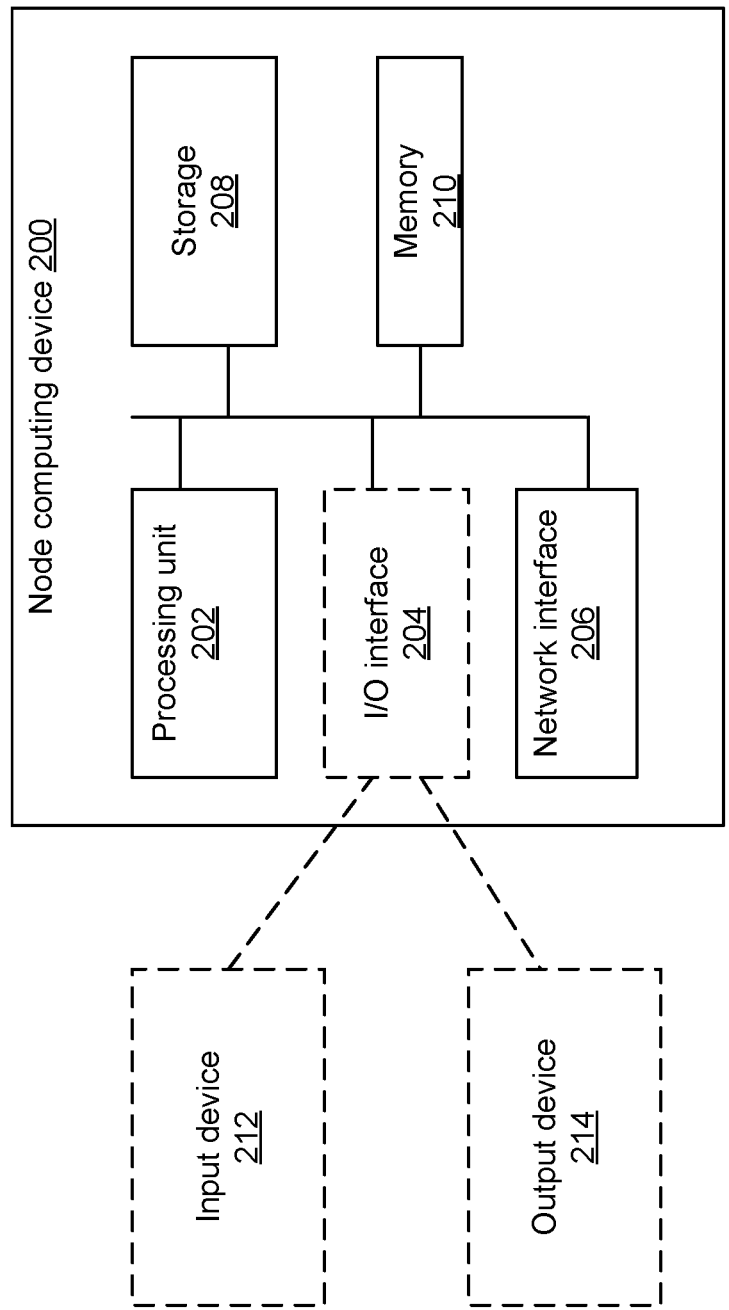
FIG. 2 is a block diagram illustrating an example node computing device that can be employed to implement example embodiments of the methods and systems in accordance with an example embodiment.

In example embodiments, client devices 130 send to the nodes 120 the smart contract request containing agreement conditions, which is in a Domain-Specific Language (detailed below), for processing. The nodes 120 contain a smart contract compiler that compiles and evaluates the received smart contract request. When consensus is achieved among the nodes 120, the transaction for the executed input string is recorded on the blockchain. FIG. 2 is a block diagram illustrating a node computing device 200 which can be any one of nodes 120. The node computing device 200 may be an individual physical computer, multiple physical computers such as s server, a virtual machine, or multiple virtual machines. Dashed blocks represent optional components. Other example computing devices are suitable for implementing example embodiments, which can include components different, more, or fewer, from those discussed herein. Although FIG. 2 shows a single instance of each component, there may be multiple instances of each component in the node computing device 200. Also, the node computing device 200 could be implemented using parallel and/or distributed architecture.

In this example, the node computing device 200 includes one or more processing units 202, such as a CPU, GPU, an MCU, an ASIC, a field-programmable gate array (FPGA), a quantum processing unit (QPU), a dedicated logic circuitry, or combinations thereof. Each of the aforementioned processing units may include various hardware components, whether fabricated on-chip or separate.

The node computing device 200 may also include one or more optional input/output (I/O) interfaces 204, enabling interfacing with one or more optional input devices 212 and/or output devices 214. The node computing device 200 may include one or more network interfaces 206 for wired or wireless communication with a network (e.g., an intranet, the Internet, a P2P network, a WAN and/or a LAN). The network interface(s) 206 may include wired links (e.g., Ethernet cable) and/or wireless links (e.g., one or more antennas) for intra-network and/or inter-network communications for receiving parameters or sending results.

The node computing device 200 includes one or more storage units 208, which may include a mass storage unit such as a solid-state drive, a hard disk drive, a magnetic disk drive and/or an optical disk drive. The node computing device 200 also includes one or more memories 210, which may have a volatile or non-volatile memory (e.g., a flash memory, a random access memory (RAM), and/or a read-only memory (ROM)). The memory(ies) 210 (as well as storage unit 208) may store instructions for execution by the processing unit(s) 202. The memory(ies) 210 (as well as storage unit 208) may store opcodes, byte sequence programs, executable smart contract representations, and the smart contract compiler. Further, the memory(ies) 210 and storage unit 208, and the processing unit (2), collectively, support the blockchain database, which the blockchain, in example embodiments, Ethereum use, to maintain immutability. In example embodiments, the smart contract compiler, stored in memory 210 or storage unit 208, is accordingly immutable, transparent, auditable, and traceable.

The memory(ies) 210 may include software for the smart contract compiler, including its three modules: parsing, interpreting, and encoding. The memory(ies) 210 may include software instructions for implementing an operating system (OS) and other applications/functions. The other applications/functions can include various user programs such as blockchain node software or client software. In some examples, instructions may also be provided by an external memory (e.g., an external drive in communication with the node computing device 200) or may be provided by a transitory or non-transitory computer-readable medium. Examples of non-transitory computer-readable media include a RAM, a ROM, an erasable programmable ROM (EPROM), an electrically erasable programmable ROM (EEPROM), a flash memory, a CD-ROM, or other portable memory storage.

Optional input device(s) 212 (e.g., a keyboard, a mouse, a microphone, a touchscreen, a camera, a sensor and/or a keypad) and optional output device(s) 214 (e.g., a display, a speaker, a signal detector and/or a printer) are shown as external to the node computing device 200 and connected to optional I/O interface 204. In other examples, one or more of the input device(s) 212 and/or the output device(s) 214 may be included as a component of the node computing device 200.

In some examples, the client devices 130 can be a computing device having components and features similar to the node computing device 200.

Figure 3:
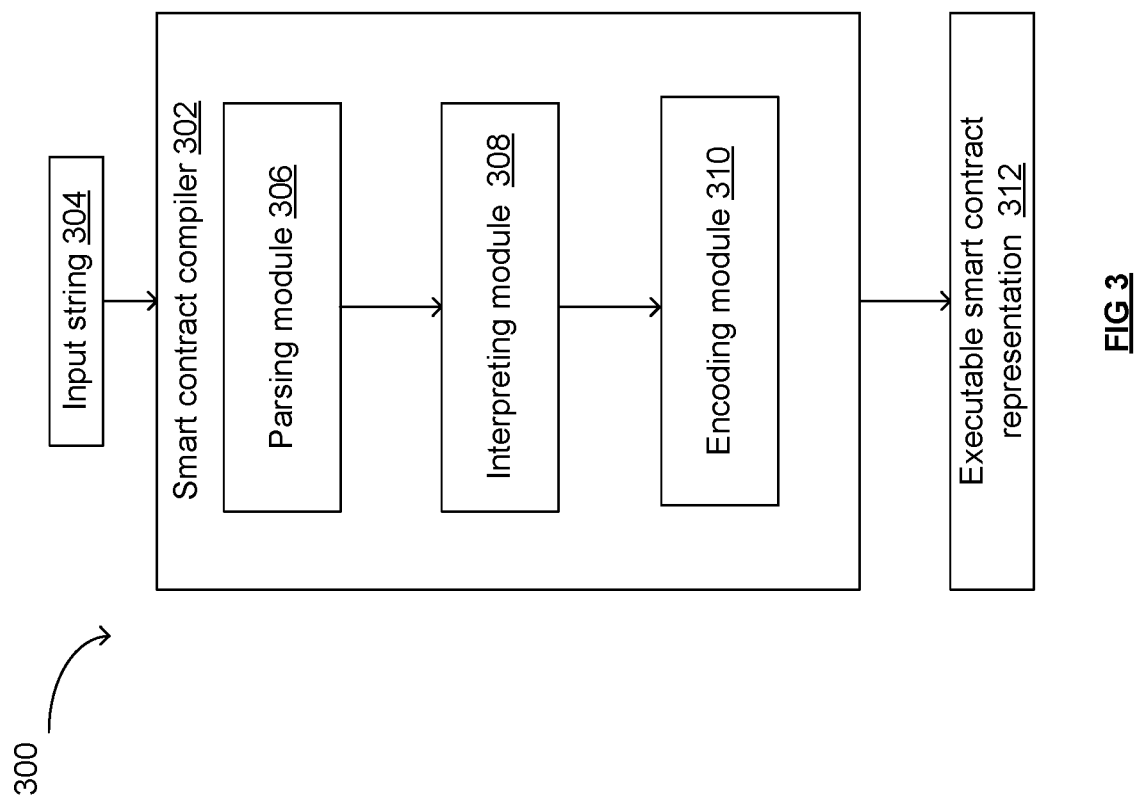
FIG. 3 is a block diagram of the smart contract compiler showing the parsing module, the interpreting module, and the encoding module in accordance with an example embodiment.

FIG. 3 is a block diagram of the smart contract compiler 302. The smart contract compiler 302 is a smart contract, e.g. code, deployed to a blockchain, more specifically, deployed to the nodes 120 of the blockchain. The smart contract compiler 302 comprises three modules: a parsing module 306, an interpreting module 308, and an encoding module 310. The operations performed in each module will be explained. It would be understand that which module performs what operation is just an example. Any operation discussed below can be performed in any one or more of the three modules (parsing module 306, interpreting module 308, and encoding module 310). Further, the operations may be performed by more than three modules, particularly as the complexity of the input string or its translation into executable smart contract form increases.

The smart contract compiler 302 receives an input string 304 from a client device 130 input by a user, a string in a pre-specified structure defines an executable program of a smart contract request which may contain conditions, that if met, the executable program specified in input string 304 is executed on the blockchain. Hence, the conditions trigger execution of the input string. Some example embodiments of the input string may not have conditions. In other example embodiments, the executable program is performed at runtime when the smart contract compiler 302 processes the input string 304. The input string 304 may be originated from client devices 130 (e.g. by a human) or from intermediary device 150 (e.g. by an autonomous machine agent).

An input string 304 could be a request to pay person A. When the conditions of input string 304 are met, an amount X is deposited into person A's account, and the respective transaction is recorded on the blockchain. Further, other input strings 304 may depend on satisfaction of transactions and conditions contained in a preceding input string 304. For example, a first input string similar to input string 304 may represent conditions and transactions for depositing collateral of type Y, while a second input string similar to input string 304 may represent a transaction for a withdrawal of loan funds with a strict condition that transactions and conditions contained in the first input string has been successfully executed on the blockchain. The input string 304 is a string that traditionally needs to be coded using a technical programming language, such as Solidity™, and implemented off-chain. Instead, the smart contract compiler 302, which is deployed on-chain, receives the input string 304 from a client device 130 and converts the input string 304 on-chain to an executable smart contract representation 312. When executed by the EVM, in examples where the blockchain is an Ethereum blockchain, the executable smart contract representation 312 performs similarly to that if the input string 304 was implemented in a programming language off-chain.

In example embodiments relating to finance applications, the input string 304 may have signatory, transaction type, action, amount, asset, and agreement conditions. The parsing module 306 of the smart contract compiler 302 receives the input string 304 from a client device 130 and parses the input string 304 into an object structure. In example embodiments, the smart contract compiler 302 may receive the input string 304 from the intermediary device 150. The interpreting module 308 maps the object structure into a byte sequence program. The interpreting module 308 also expands nested components of the input string 304 into segments when executed through steps to output the unpacked result of the nested components. In example embodiments, the conditions have nested components, which make the conditions as nested conditions. In example embodiments, the amount has nested components, which make the amount as nested amounts. When expanding nesting components, each step consumes at least two values and returns a boolean result (e.g. TRUE or FALSE). The encoding module 308 transforms the byte sequence program into executable smart contract representation 312 for execution by the EVM.

The byte sequence program uses native functions or native operations of Solidity™. For instance, the byte sequence program may perform addition, subtraction, multiplication, etc., using native functions or native operations of Solidity™. Several of these native functions or native operations are primitive functions or primitive operations, which are available in several programming languages. The encoding module 310 implements primitive Solidity™ functions or primitive operations as executable smart contract representations. Executable smart contract representations are smart contracts executable by the blockchain. The executable smart contract representation is contained in a smart contract identified by a unique contract account address on the blockchain. This account address has a one-to-one mapping with the executable smart contract representation. As such, the executable smart contract representations are also interchangeably referred to as simply smart contracts. Therefore, instead of using off-chain implementation of the one or more native Solidity™ functions or native operations, the smart contract compiler 302 uses the on-chain counterpart implemented functions or operations in smart contracts representations. Using the on-chain counterpart facilitates the use of more simpler customizable domain-specific languages for creating executable smart contracts, with the smart contract compiler 302 enabling full transparency of the on-chain compilation of the smart contract representation and resulting smart contract executables.

Traditionally, native functions or native operations would need to be hardcoded to be invoked. For example, to sum two variables, a developer would need to type a+b, and the a+b operation is compiled, off-chain, and transformed into a byte sequence program then deployed on-chain. However, using the encoding module 310, the respective counterpart executable smart contract representation deployed on-chain is called instead of the native operation, in this example the operation (+). Likewise, the on-chain (+) operation might be specified by an input string 304 containing the human-readable word SUM. Hence, hardcoding the native operations or native functions may be avoided, which makes the input string 304 compact, human readable, and fit-for purpose according to the application domain. Primitive operations or primitive functions may be found in Solidity™ or other programming languages. Primitive operations or primitive functions may include addition, subtraction, division, multiplication, greater than, less than, equal, not equal, sorting, filtering, indexing, looping (e.g. while, for), if-else statements, switch statements, etc. The list of primitive operations depends on the programming language, and the aforementioned operations and functions are just examples. There is no conclusive definition of primitive, but in examples the primitive operations could be any native function or native operation of Solidity™.

Example embodiments implement native functions or native operations for data source functions, such as logical TRUE, logical FALSE, and read-only variables. Other data source functions may include retrieving value at call-time from an on-chain data source (e.g. oracle). Example embodiments may also implement formulas or instructions for transformation of data. Example embodiments may implement operator contracts such as a smart contract for binary comparators such as equal==, not equal !=, less than <, or greater than >. Example embodiments may also implement executable smart contract representations for logical AND, logical OR, iterative functions such as a counter that increases an index by exactly one unit (e.g. NEXT), aggregation functions such as providing the total count of a given element (e.g. COUNT) or providing the sum of a set of elements (e.g. SUM). Example embodiments may also implement compositions of native functions or native operations.

Figure 4:
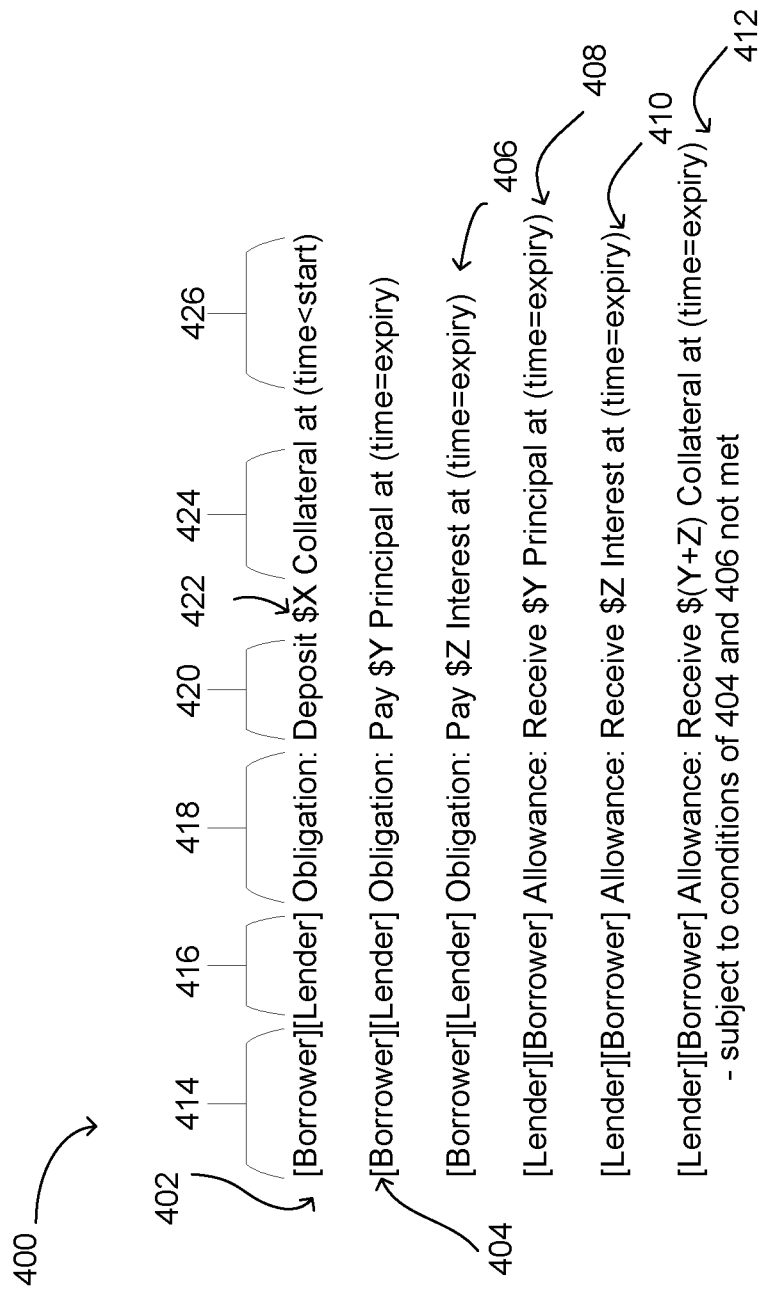
FIG. 4 shows example input strings for the smart contract compiler in accordance with an example embodiment.

FIG. 4 shows example input strings. The smart contract compiler 302 receives the input string 304 from a client device 130, such as example input strings 402, 404, 406, 408, 410, 412. It is worth mentioning that the structure of the input strings shown in FIG. 4 is an example and not meant to be a limitation. Other formats may be equally applicable. The input string 304 can be a recursive data structure. The input string 304 may also be a domain-specific language. Domain-specific languages (DSL) are designed for a specific task. Some DSLs are designed for smart contracts; for example, AxLang is designed for writing verifiable smart contracts; BOScoin Trust Contracts is designed for encoding contracts on a blockchain; DAML provides a verifiable way for parties to a transaction to provide updates to a distributed ledger; Hyperledger Composer is designed for writing smart contracts but for Hyperledger blockchains; Imandra is designed for modelling and verifying properties of Ethereum smart contracts; Marlowe targets financial contracts; MLFi is a contract modelling language; Pyramid is designed for writing smart contracts for the EVM; Quant DSL is designed for financial contracts; Rholand is designed for Synereo's blockchain technology and many others.

Some DSL may not be oriented towards smart contracts. For example, DOT, a language that can describe a graph; XML for representing data, Sed for text transformation, SQL for modifying a relational database, AML usually used for efficient computations in life insurance and pension products, GLML as a legal markup language. These are examples of DSLs that may be used to represent the input string 304.

FIG. 4 shows example input strings 402, 404, 406, 408, 410, 412. These example input strings 402, 404, 406, 408, 410, 412 represent a financial smart contract request; however, it is understood that input strings 304 for different industries may be equally applicable. Each example input string (402, 404, 406, 408, 410, 412) has information including a first signatory 414 and a second signatory 416, transaction type 418, action 420, amount 422, asset 424, and one or more agreement conditions 426. The first signatory 414 and a second signatory 416, transaction type 418, action 420, amount 422, asset 424, and one or more agreement conditions 426 are typical elements forming a financial services transaction. However, it is understood information objects specific to different industries may be equally applicable for the composing elements of input strings 304.

The first signatory 414 and second signatory 416, for example, can be the lender or the borrower. The first signatory 414 and second signatory 416 determine the contract parties for example input strings 402, 404, 406, 408, 410, and 412. The transaction type 418 may include whether the smart contract request is for an allowance or an obligation of the first signatory 414. The action 420 is the action requested by the input string 304 to be performed by the blockchain after being compiled by the smart contract compiler 302. For example, paying, making a deposit, receiving money, etc. The amount 422 has data value, which is the amount set to send or receive. The amount 422 may be a number hardcoded in the string, a state variable to be evaluated at call time, or a formula whose end result determines the amount. The asset 424 specifies the type of asset targeted for the action 420, such as a collateral deposit, a lender deposit, a loan principal withdrawal, an interest payment, an insurance premium deduction, administrative fee charged, etc. The agreement conditions 426 represent the conditions that, once satisfied, the smart contract request described by the example input string (402, 404, 406, 408, 410, 412) is performed and evaluated, and subsequently recorded on the blockchain.

For example, the example input string 402 describes a smart contract request with conditions related to time; when the time is before a predefined start time, the borrower, which is a user borrower of a client device 130, e.g. client device 130-3 and client device 130-4, has an obligation to make a collateral deposit worth X of a currency unit for the lender, which is a user lender of a client device 130, e.g. client device 130-3 and client device 130-4. The deposit's worth of X can be a number hardcoded in the string, a state variable to be evaluated at call time, or a formula whose result determines the amount. Further, in example 404, when the time reaches an expiry time, the borrower has an obligation to pay Y amount of a currency unit to the lender as a principal. For example input string 406, the borrower also has an obligation to pay the lender a deposit of amount Z of a currency unit when time reaches the expiry time.

On the other hand, for example input string 408, the lender receives Y amount of a currency unit, which the borrower sent in example input string 404. The received amount is for the principal. Example input string 408 is evaluated when time reaches the expiry time. In other words, the input string 408 can be converted to executable smart contract representations whose execution is set to trigger when time reaches expiry time. Further, example input string 410 determines that when time reaches the expiry time, the lender also receives an amount of Z as interest, which the borrower fulfills via example input string 406. Example input string 412 indicates that the lender is allowed to take a value equal to principal and interest from the collateral should the smart contract request in example input string 404 and example input string 406 are not satisfied. In other words, if the borrower did not pay principal and interest by the expiry time, the lender can take (claim) the principal plus interest amount worth from the collateral. The execution is triggered through input from the client device 130, intermediary device 150, or the node computing device's 200 resources (e.g. time).

Referring back to FIG. 3, the smart contract compiler 302, in nodes 120, receives the example input string 402, 404, 406, 408, 410, 412 for example from the client device 130. The client device 130 can send each example input string 402, 404, 406, 408, 410, 412 at the same time or at different times. In some examples, the client device 130 receives the example input string 402, 404, 406, 408, 410, 412 from a user, and then sends the received example input string 402, 404, 406, 408, 410, 412 to the nodes 120. The smart contract compiler 302 then transforms through the three modules: parsing module 306, interpreting module 308, and encoding module 310, the input string 304 into executable smart contract representations. The smart contract compiler 302 may not accept all input strings. The smart contract compiler 302 may check whether the user providing the input string 304 to the client device 130 has permission or authorization to provide the input string 304. In some embodiments, the permission of the user providing the input string 304 may be authenticated from a user wallet address, otherwise known as an externally owned account (EOA). In some example embodiments, the permission of the user providing the input string 304 may be authenticated using a third party authentication service (e.g. SMS one-time-password) that registers on-chain via Oracle.

Similarly, the smart contract compiler 302 may check whether the client device 130 has permission or authorization to provide the input string 304. In example embodiments, the smart contract compiler 302 may check whether the client device 130 sending the input string 304 has permission or authorization to send the input string 304. Example embodiments can have the smart contract compiler 302 check the ranking of the user providing the input string 304 to the client device 130, e.g. seniority or layer of a capital stack (described in greater detail below), adjudicator, administrator, etc. Example embodiments can have the smart contract compiler 302 check the ranking associated with the client device 130 instead of the user of the client device 130, or use a predefined program consuming one or more data sources to determine permission or authorization of input string 304 as input for smart contract compiler 302.

Traditionally, a developer would need to implement the information of the input string in Solidity™, compile the implementation off-chain on a computing device, then deploy the byte sequence code on a blockchain (on-chain) for execution. The off-chain components remove transparency of a smart contract code update. In contrast, the smart contract compiler 302 makes upgrading smart contracts fully transparent. The three modules (the parsing module 306, the interpreting module 308, and encoding module 310) enabling upgrading smart contract on-chain while preserving transparency are discussed hereinafter.

Figure 5A:
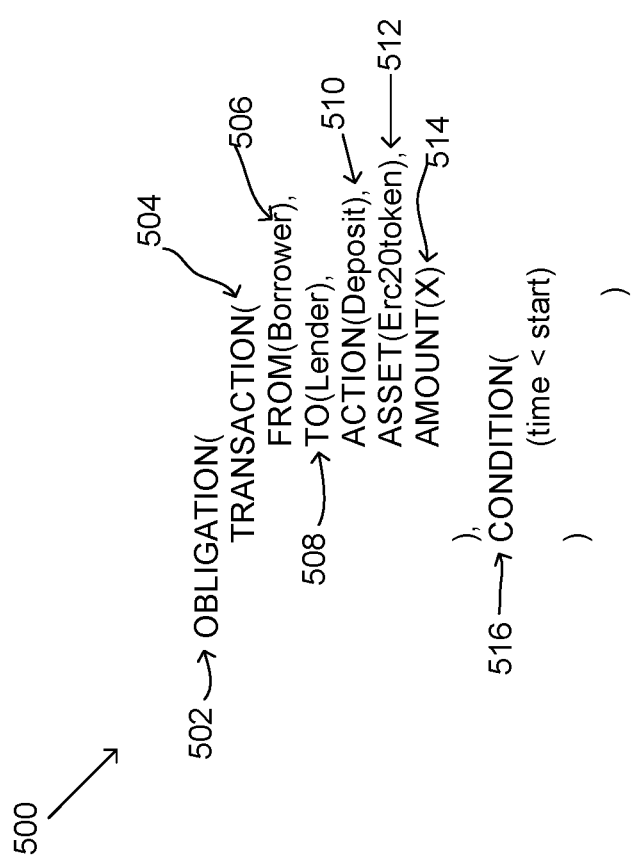
FIG. 5A is an example output of the parsing module parsing an input string of one of the input strings in FIG. 4 into an object structure in accordance with an example embodiment.

FIG. 5A shows an example output of the parsing module 306 for an input string 304. The object structure 500 is the output of the parsing module 306 for example input string 402. This object structure 500 is in string format structured as an object-oriented object structure. A person skilled in the art would understand that the object structure 500 shows nested objects: an object of objects. The parent object is the obligation object 502, which is the parsing of the transaction type 418 of the example input string 402. The obligation object 502 may have two further objects; a condition object 516 and an object wrapper for the transaction object 504, including multiple objects. It is clear to a person skilled in the art that the transaction object 504 relates to the smart contract request and not to the blockchain transaction, which is recorded on the blockchain upon evaluating the input string 304. The transaction object 504 comprises a plurality of objects such as a "from object" 506, a "to object" 508, an "action object" 510, an "asset object" 512, and an "amount object" 514, content of each is parsed out from the example input string 402. The "from object" 506 corresponds to the first signatory 414 of the example input string 402, the "to object" corresponds to the second signatory 416 of the example input string 402, the "action object" 510 corresponds to the action 420 of the example input string 402, the "asset object" 512 corresponds to the asset 424 of the example input string 402, and the "amount object" 514 corresponds to the amount 422 of the example input string 402. Further, the parsing module 306 parses out the content of the condition object 516 from one or more conditions of the example input string 402.

The object structure shown in FIG. 5A is an example and not meant to be a limitation; other object structures may be used. For instance, the object structure may be a nested tree, where each leaf is another object structure. In the example embodiment shown in FIG. 5A, the obligation object 502 may be the tree's root, and the leaves may be the other objects, where each leaf is an object.

The object structure 500 is in text format and is received by the interpreting module 308. The object structure 500 may represent a syntax tree of the example input string 402. The interpreting module 308 maps the object structure 500 to a byte sequence program in two steps. First, the interpreting module 308 changes the objects of the object structure into respective opcodes having respective byte sequence representation, then these opcodes are structured and sequenced to generate the byte sequence program in the second step. In some embodiments, the byte sequence program may include meta-data. The meta data of the byte sequence program may contain one or more program indices. The program indices may index subprograms within the byte sequence program. The program indices may be contained in an executable smart contract. The program indices can have a byte sequence representation. In some embodiments, the program indices as a byte sequence representation may be concatenated with the byte sequence program.

Mapping the objects into respective opcodes may be performed using a look-up table. In addition to opcodes, object structure 500 may also contain data elements (also referred to as data value) e.g. "amount object" 514. The object structure 500, as a combination of operations and data, can be unpacked and flattened as a linear sequence of program steps where outputs of the preceding step serve as input for the current step. Further, each operation may consume a fixed number of data elements also contained in the program steps. After generating the opcodes and data values, the opcodes and data are concatenated to determine the byte sequence program form of an object structure 500.

FIG. 5B shows an example conversion table 550 invoked by the interpreting module 308 for object structure 500, where the object structure 500 is represented as a linear sequence of program steps 552 for each object element 554. In some embodiments, the interpreting module 308 may be engineered to reorder object elements 554 according to an optimal sequence of linear program steps 552. Further, each object element 554 of object structure 500 maps directly to either an opcode 556 or data element 558. Further, each opcode 556 or data value 558 has a unique byte sequence representation 560, typically conveyed in hexadecimal form. Further, an opcode 556 or data value 558 (e.g. data for amount object 514), along with respective byte sequence representation 560, may map to a native Solidity™ function 526 for mediating blockchain execution of that particular program step 552 on the EVM. The sequence of opcodes 556 and data elements 558 are synchronous with program steps 552 and, likewise, the order of byte sequence representation 560 and executing native Solidity™ functions 562. Thus, references to "opcodes", "data elements", "byte sequences" and "functions" can be used interchangeably when describing how program steps are executed.

In some embodiments, an opcode 556 may require one or more data elements 558 or other opcodes 556 as input by advancing iteratively through subsequent program steps until all required input elements or evaluations of them are consumed for execution of the root opcode (e.g. CONDITION in first program step 552). For example, for the first two steps in program steps 552, the executable smart contract representation, generated by the encoding module 310, for the root opcode for CONDITION in the first program step, which represents condition object 516, consumes the next opcode for < in the second program step as input to initiate a conditional evaluation. In order to evaluate the first program step, the second program step must complete its own evaluation by consuming the inputs provided in the third and fourth program steps. At this point, the evaluations reach the endpoints and the interpreting module 308 recursively uses these values for the preceding second program step <, with the evaluated result then used as the required input for the first program step for the root opcode for "CONDITION" representing condition object 516. The root opcode, in turn, is mapped in the interpreting module 308 to execution of Solidity™ function "require" which can be set to require the second program step to return a logical TRUE value, so that if the value is logical FALSE, eventually the execution of the generated executable smart contract representation is halted on the EVM thereby returning a failed transaction; on the other hand, if the value returned is logical TRUE, when deployed on-chain, the generated executable smart contract representation proceeds to the opcode for TRANSACTION in the fifth program step, which represents transaction object 504, to initiate a financial transaction via Solidity™ function "delegatecall" whose input is dependent on evaluation of the remaining programming steps.

In some embodiments, when consuming a data value 558 as input, the respective executable smart contract representation 312 of a native Solidity™ function 562 for an opcode 556 can be engineered to consume input of fixed byte length contained in one or more proceeding program steps. For example, the encoding module 308 may restrict byte sequence representation 560 to 256-bytes for numeric values, 80-bytes for blockchain addresses, and 4-bytes for opcodes. As such, a set of byte sequence representation 560 can be concatenated to produce a byte sequence program 564. Further, the byte sequence program 564 functions as an on-chain Turing tape, meaning the byte sequence program 564 contains a limited but complete stepwise instruction set for executing a Turing-complete program as specified by object structure 500 and its originating example input string 402. Thus, the interpreting module 308 changes a string representing an object structure into a byte sequence program 564.

It is understood that FIG. 5B is an example, and not a limitation, alternative indexing, mappings or format for such a conversion table are possible. Whichever indexing method is chosen, the interpreting module 308 as part of smart contract compiler 302 has the index implemented on the blockchain. By consequence, converting an object structure 500 input to a byte sequence program 564 output using the interpreting module 308 explicitly registers a precise mapping between these inputs and outputs on the blockchain, making the transformation process fully inspectable and auditable by an independent observer of the smart contract compiler 302.

While the parsing module 306 and the interpreting module 308 may be optional as one can perhaps transform an input string 304 to the respective byte sequence program, it is much easier to recursively evaluate the conditions when organized in an object structure than recursively processing input string 304 in DSL format directly. The transformation enables the conversion of more complex conditions for the input string 304 into respective byte sequence program. Accordingly, it is understood that not all object structures 500 will have a straightforward linear representation as FIG. 5A and FIG. 5B. Instead, the interpreting module 308 can interpret non-linear program representations by recursively processing one or more objects of objects. At the current time, Solidity™ does not have an object structure. The transformation step may become less crucial if upcoming versions (e.g., greater than v0.8.11) of Solidity™ have object structures. However, the implementation of object structures and recursive processing in smart contract compiler 302 can enable increasing complexity of agreement conditions.

The encoding module 310 may receive the byte sequence program (e.g. byte sequence program 564) from the interpreting module 308 and map the byte sequence program into at least one executable smart contract representation 312 (shown in FIG. 3). The encoding module 310 performs that through mapping. As explained above, the encoding module 310 implements primitive Solidity™ operations or primitive functions as a smart contract, which are callable while being on-chain. The smart contract representations implemented by the encoding module 310 are also referred to as executable smart contract representations. Each smart contract has a respective opcode that can call the executable smart contract representation on-chain. The encoding module 310 enables generating executable smart contract representations for a byte sequence program across various platforms. The platforms may be utilizing different EVMs, blockchains, primitive operations, primitive functions, native operational codes, native data specifications or other specialized properties. As such, encoding module 310 enables interoperability between a given byte sequence program (e.g. byte sequence program 564) and its consistent on-chain execution across various platforms.

The encoding module 310 recognizes each function or operation called by the interpreting module 308 from respective opcodes or byte sequence program and maps each function to the respective function and operation implemented as a smart contract for a given blockchain. For example, referring back to FIG. 5A and FIG. 5B, object structure 500 has a direct mapping to opcodes 556 and respective byte sequence representations 560 made by interpreting module 308. The encoding module 310, thereby, completes the compilation process by invoking executable smart contract representations of Solidity™ functions 562. Therefore, there will be two opcodes for functions and operations: opcodes for the native functions or native operations and opcodes for functions and operations written in Solidity™ as smart contracts. Implementing functions and operations written in Solidity™ that can be called by the compiler of Solidity™ instead of calling respective native functions or native operations is called programmatic construction. The native functions or native operations written in Solidity™ are on-chain, and each has a respective opcode. The encoding module 310 maps the opcodes of the native functions or native operations to the opcodes of the executable smart contract representations on-chain.

It is to be appreciated that smart contracts can call other smart contracts. Therefore, the smart contract compiler 302 can call smart contracts (executable smart contract representations) implementing native functions or native operations of Solidity™. When a function or operation that is native in Solidity™ has a corresponding implementation as a smart contract (executable smart contract representation) deployed on-chain, the respective smart contract is called instead of the native function. No hardcoding of the native functions or native operations is needed if the functions and operations have respective executable smart contract representation. For example, if the addition operation is to be performed, then instead of hardcoding+to add two elements, the smart contract for the respective addition operation is called. However, when a respective function or operation does not exist, then the native operation can be used, and for that, such native function or operation would need to be hardcoded. In most example embodiments, the respective functions or operations implemented will often be restricted to only the subset of native functions or operations required to support a given DSL.

Smart contracts may be implemented for all operations and functions for all input strings 304. However, that may be cumbersome. While the agreement conditions are dynamic, e.g. each input string 304 may have different conditions, the other information in the input string 304 may not be as dynamic. For example, there is a limited number of transaction types or asset types. Therefore, a respective smart contract for each information may be implemented, apart from the agreement conditions. Referring again to FIG. 5A. For instance, the action object 510, may be one of "pay", "deposit", "receive", etc. So a smart contract may be implemented for "pay" action, another smart contract for "deposit" action, and another smart contract for "receive" action may be implemented and called when needed. While the previous list is not conclusive, there is likely a limited number of action objects 510 that a DSL may have.

Unlike action objects 510, amount object 514 and condition object 516 may have nested components (e.g. recursive) of amounts or conditions. Having smart contracts for all possible agreement conditions and amounts may not be practical. For example, if the conditions are ((time>expiry date) and (time<expiry date)) then having a smart contract for these conditions is not practical because any variations would require another smart contract representation (e.g. ((time>expiry date) or (time<expiry date)) would require another smart contract). Instead, the interpreting module 308 expands the agreement conditions and amounts into segments of functions or operations recursively based on the order of operations, then the interpreting module 308 would have a smart contract representation for each of the segments. Below the expansion of agreement conditions is explained, and a similar approach is used for expanding the amounts.

Figure 6A:
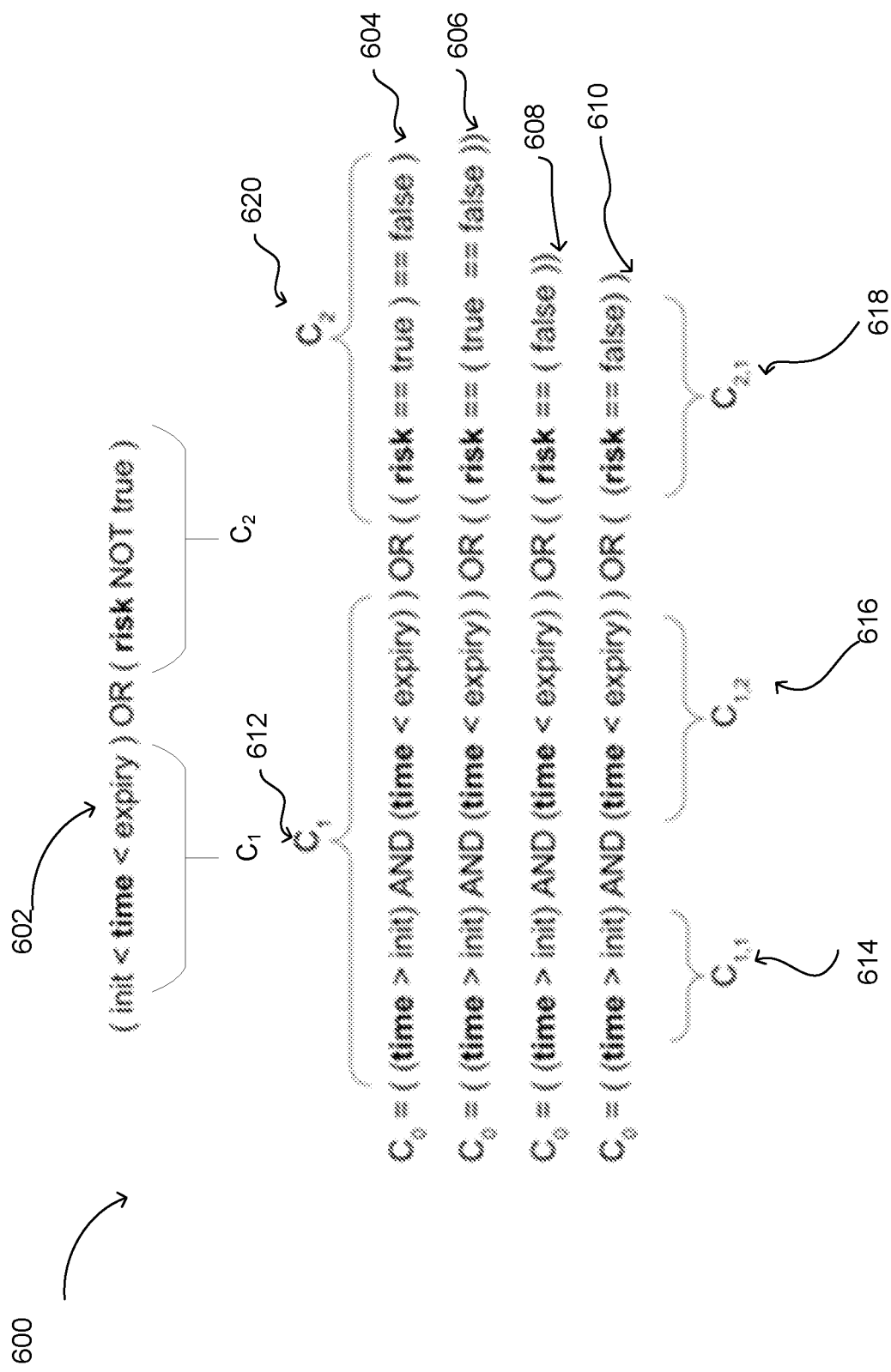
FIG. 6A is a schematic describing an expansion of agreement conditions by the smart contract compiler in accordance with an example embodiment.

FIG. 6A shows the interpreting module 308 expanding conditions for the encoding module 310 to map into respective smart contracts (executable smart contract representations). The smart contract compiler 302 receives, as part of the input string 304, the conditions 602. The interpreting module 308 expands the agreement conditions based on the order of operations. The sequence of operations needed to be performed by the smart contract compiler 302 is demonstrated as steps 604, 606, 608, 610.

It is to be understood that FIG. 6A is just an example, and multiple steps can be combined into one step. The purpose is to expand the conditions 602 into segments (e.g. $C_{1,1}$ 614, $C_{1,2}$ 616, $C_{2,1}$ 618) shown in step 610, where each segment has a respective smart contract.

To determine the segments (614, 616, 618), conditions 602 (which are the agreement conditions) are first split into two segments $C_1$ 612 and $C_2$ 620. This split is performed since logical OR may have the highest order of operations. At step 604, segment $C_1$ 612 is further expanded into segments where each has a respective smart contract available to be called by the smart contract compiler 302. For instance, there exists a smart contract for evaluating A>B, where A in this example may be time and B may be init, which may stand for the initial time. Further, there is another smart contract for evaluating A<B, where A is time and B is expiry, which may stand for expiry date. The two segments mentioned are for $C_{1,1}$ 614 and $C_{1,2}$ 616, respectively, shown in step 610.

On the other hand, the interpreting module 308 performs a series of steps to expand $C_2$ 620 into segment $C_{2,1}$ 618 that has a respective smart contract. Further, a person skilled in the art understands that logical "NOT TRUE" means A is "FALSE", whereas A in this example is risk. However, if the smart contract compiler 302 does not have access to a smart contract for "NOT TRUE", then the interpreting module 308 needs to expand "NOT TRUE" until arriving at a segment represented by a smart contract.

In this example embodiment, the interpreting module 308 expands $C_2$ 620 in four steps (604, 606, 608, 610) to arrive at segment $C_{2,1}$ 618. When the interpreting module 308 arrives at segments with respective smart contracts, the smart contract compiler 302 can evaluate such conditions successfully. The smart contract compiler 302 may receive variable values of time and risk to evaluate the conditions from various sources, such as oracle, user input, computer resources, etc.

Thus, segments ($C_{1,1}$ 614, $C_{1,2}$ 616, $C_{2,1}$ 618) at step 610 representing the conditions 602, from the input string 304, can each be represented by a smart contract. Therefore, evaluating the segments in step 610 is equivalent to evaluating conditions 602.

Traditionally, if the conditions 602 are implemented (coded) into the client device 130 and deployed to the nodes 120, the operations of the conditions 602 would need to be hardcoded off-chain using native Solidity™ functions or native operations such as <, >, OR, NOT, TRUE. Hardcoding the conditions 602 off-chain then deploying the conditions 603 to a blockchain makes them practically not upgradable, nor transparent to contract parties observers. On the other hand, theoretically, the segment 612, even if hardcoded, can be upgraded if the conditions are changed on all nodes 120, which is practically not feasible due to the immutability of blockchains. However, the conditions 602 do not need to be hardcoded when using the smart contract compiler 302. Instead, the smart contract compiler 302 expands into segments and calls respective smart contracts (executable smart contract representations) for each segment stored on the blockchain to represent the conditions 602 while being deployed to the blockchain. Hence, no hardcoding of conditions 602 is needed as the smart contract compiler 302 produces a complete on-chain audit trail across all nodes 120 from conditions 602 through the smart contract compiler 302 subsequent processing steps into executable smart contract representation 312 upgrading an existing smart contract (e.g. input string 304) at a given contract address on the blockchain.

The abovementioned feature of the smart contract compiler 302 enables the upgradability of agreement conditions since no hardcoding is performed and complete transparency of the upgrading process is registered and maintained as immutable transactions on the blockchain. For instance, if parties to a contract wish to change agreement conditions, the desired input string 304 with desired information is provided to the smart contract compiler 302. The smart contract compiler 302 would parse the input string 304 into object structure, interpret the input string 304, expand the agreement conditions, and then encode the byte sequence programs to respective smart contracts deployed on-chain.

Figure 6B:
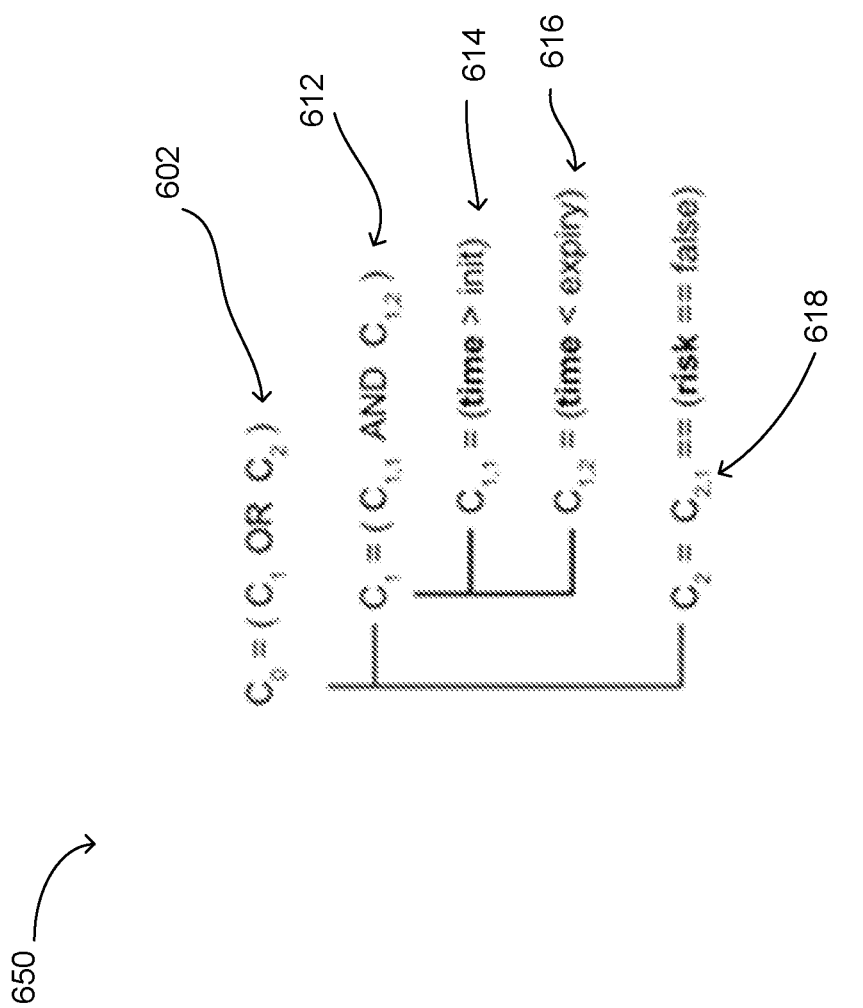
FIG. 6B is a schematic describing the expanded agreement condition of FIG. 6A in accordance with an example embodiment.

FIG. 6B is an explanatory example explaining the expansion steps the smart contract compiler 302 performs when representing the conditions 602 for evaluation. FIG. 6B is a macro level of the steps. Such evaluation requires the smart contract compiler 302 to evaluate segments 616 and 614 to evaluate segment 612. Further, the smart contract compiler 302 needs to evaluate segment 618. Upon evaluating both segments 612 and 618, the conditions 602 can be evaluated. It is understood by a person skilled in the art that segment 618 and segment 612 have the same order as to which one is to be evaluated first.

Figure 6C:
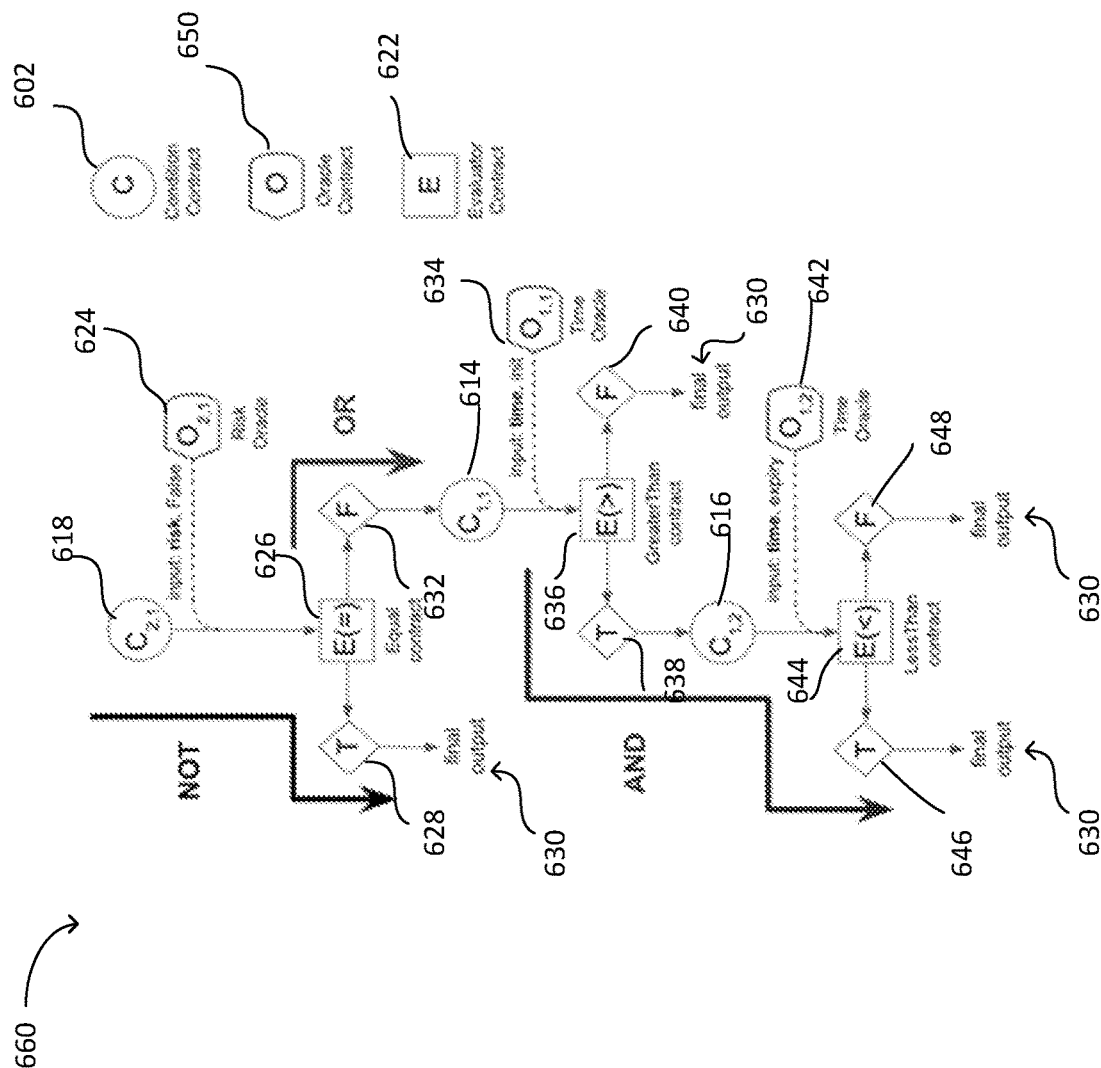
FIG. 6C is a schematic showing the smart contract compiler evaluating the expanded agreement condition of FIG. 6A.

FIG. 6C is a flow diagram explaining the smart contract compiler 302 steps in evaluating conditions 602 of a contract. In example embodiments, these steps are performed by the interpreting module 308, but it is understood the steps can be performed in any of the three modules (parsing module 306, interpreting module 308, encoding module 310) or other modules. Processing conditions 602 comprises three components: the conditions 602; the oracle contract 650, which provides input data and may be received from the external server 140, intermediary device 150, a user of client device 130, or other resources; and evaluator contract 622, which performs the evaluations.

In the example embodiment of FIG. 6C, the conditions 602 are evaluated. The conditions 602, as explained above, are expanded as explained in FIG. 6A to segments $C_{1,1}$ 614, $C_{1,2}$ 616 and $C_{2,1}$ 618. The evaluation is performed as follows.

The smart contract compiler 302 evaluates the condition of segment $C_{2,1}$ 618 first. $C_{2,1}$ 618 requires a value of whether risk exists (logical TRUE) or does not exist (logical FALSE). The risk value may be received from an oracle contract 650 at step 624. Other sources of input may be used, including user input and computer resources. Once the data required for $C_{2,1}$ 618 is received, the evaluator contract 622 at step 626 compares the risk value to logical TRUE and FALSE. If the evaluator contract 622 at step 626 determines that the output of the $C_{2,1}$ 618 is TRUE (step 628), then the smart contract compiler 302 stops and outputs at step 630-1 the value of the conditions 602 as TRUE. Hence, the conditions 602 are satisfied, and the obligations of input string 304, for which the conditions 602 are part of, may be performed.

A person skilled in the art understands that when the risk value for $C_{2,1}$ 618 is TRUE, subsequent evaluations, e.g., evaluating segment $C_{1,1}$ 614 and $C_{1,2}$ 616 may not be needed since the value of conditions 602 results from a logical OR operation between $C_1$ 612 and $C_2$ 620. Therefore, regardless of the value of $C_1$ 612, the output 630-1 will be TRUE if the value of $C_2$ 620 is TRUE.

If the evaluator contract 622 at step 626 determines the output of $C_{2,1}$ 618 is FALSE, the evaluator contract 622 proceeds to evaluate the other equalities. In this example embodiment, the segment $C_{1,1}$ 614 is subsequently evaluated. First, the smart contract compiler 302 receives a time value from the oracle contract 650 at step 634; then, the evaluator contract 622 at step 636 determines whether the equality in $C_{1,1}$ 614 is TRUE (proceeds to step 638) or FALSE (proceeds to step 640). If the evaluator contract 622 determines the value of $C_{1,1}$ 614 is FALSE (proceeds to step 640), the smart contract compiler 302 stops and outputs FALSE at step 630-2. Since $C_1$ 612 is a result of a logical AND between $C_{1,1}$ 614 and $C_{1,2}$ 616, then determining one of the operands is FALSE makes the whole equality FALSE. Therefore, proceeding for other computations may be redundant.

If the evaluator contract 622 at step 636 determines that the value of $C_{1,1}$ 614 is TRUE (proceeds to step 638), the smart contract compiler 302 proceeds to determine the value of condition of segment $C_{1,2}$ 616. Similar to the operations performed above, a time value is received from the oracle contract 642, and the evaluator contract 622 at step 644 determines whether the time<expiry or not, e.g. whether TRUE (proceeds to step 646) or FALSE (proceeds to step 648) and outputs the result of the conditions at step 630-3, and 630-4, respectively. The outputs 630-1, 630-2, 630-3, and 630-4, or collectively 630, are the output evaluating conditions 602 of the contract.

Figure 7:
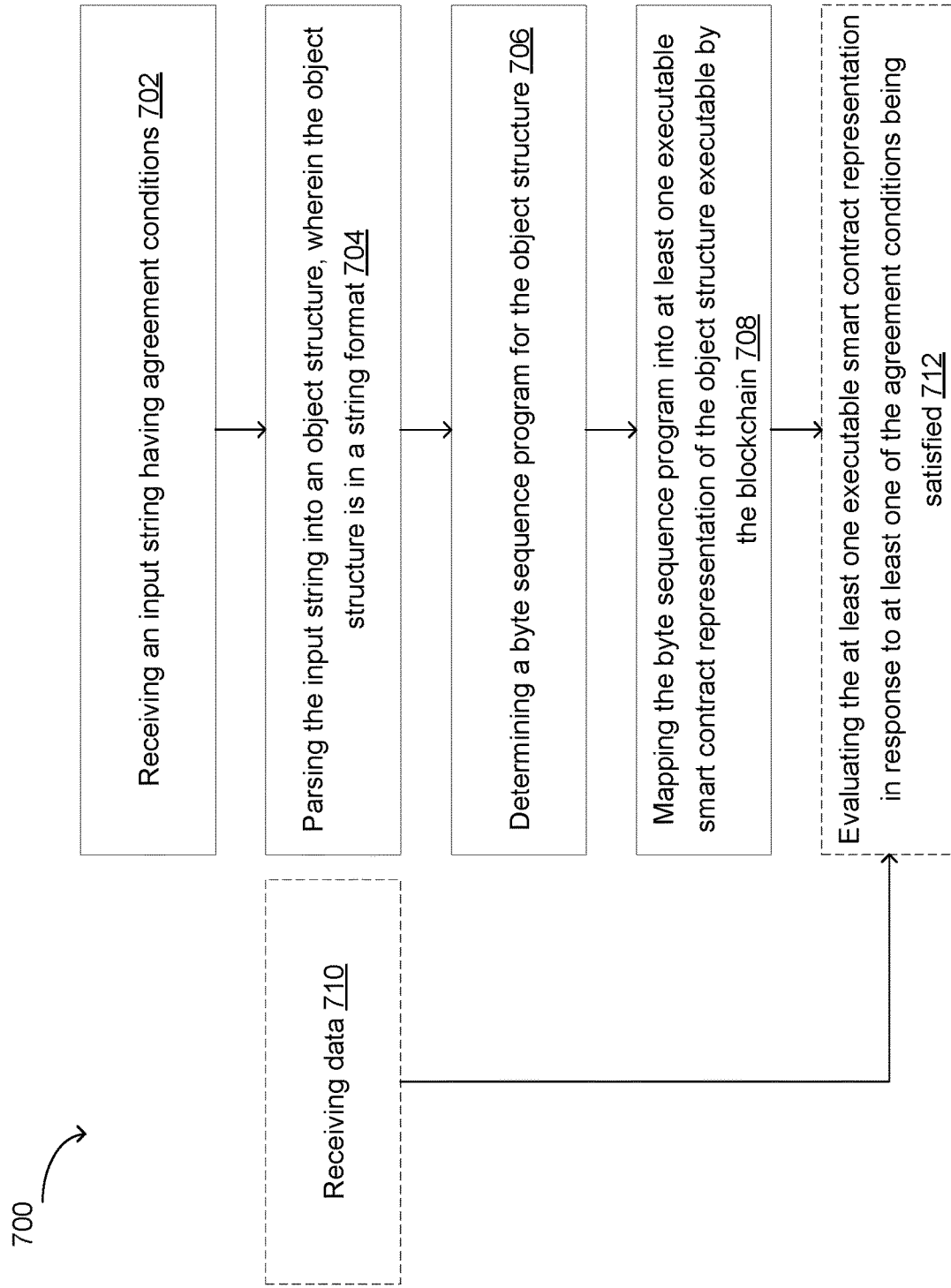
FIG. 7 is a flowchart of a method for compiling a smart contract on blockchain in accordance with an example embodiment.

FIG. 7 is a flowchart of a compiler method 700 for a smart contract. In an example, the smart contract is contained in and executed by the nodes 120 having the smart contract compiler 302. The compiler method 700 begins at step 702 where the smart contract compiler 302 receives an input string 304, from a client device 130, having smart contract request, including agreement conditions. At step 704, the smart contract compiler 302 parses, through a parsing module 306, the input string 304 into an object structure. The object structure is in a string format and could be structured as objects in object-oriented languages. The object structure may also be structured as a tree where objects are related. The object structure can be outputted to the interpreting module 308.

In example embodiments, the string format can be tokenized through compression techniques (e.g. 128-bit or 64-bit alphabets rather than EVM's 256-bit standard). The string format in these example embodiments is still in a string format but compressed. An advantage of compressing the string format includes reducing blockchain transaction fees when upgrading a smart contract.

At step 706, the interpreting module 308 interprets the object structure, using an interpreting module 308, into a byte sequence program, which is outputted to the encoding module 310. The interpreting module 308 maps the object structure into opcode then generates the byte sequence code. Further, the interpreting module 308 expands the agreement conditions provided in the input string 304 using the order of operations into segments. Each segment may be a function or operation that a programming language, e.g., Solidity™, can evaluate.

At step 708, the encoding module 310 maps the byte sequence program of the segments into respective executable smart contract representations. These smart contract representations are executable by the blockchain. The executable smart contract representations are smart contracts capable of performing the functions or operations of the programming language using smart contracts instead of the native functions or native operations of the programming language. The functions or operations are implemented as smart contracts and have opcodes. Therefore, the interpreting module 308 maps the opcodes of the functions or operations of the segments to the opcodes of the functions and operations implemented as smart contracts.

Optionally, the compiler method 700 may proceed to step 710 where data, including oracle data (e.g. from an oracle), is received by the smart contract compiler 302. The data, including oracle data, may be received from the external server 140, a user of client device 130, another smart contract deployed on the blockchain, or other resources. The data may also be obtained from resources available in the node computing device 200, such as in memory 210, processing unit 202, and storage unit 208, for example time and date.

The compiler method 700 then proceeds to step 712. At step 712, the agreement conditions are evaluated in response to a trigger. Hence, at step 712, the executable smart contract representations of the smart contract request are evaluated, and subsequently recorded on the blockchain, when the agreement conditions are satisfied. After evaluating the executable smart contact representations, the transaction for the input string 304 is recorded on the blockchain 714.

An example embodiment uses the smart contract compiler for a financial application. The input string 304 received by the node 120 represents upgrades of agreement conditions having a direct impact on a balance sheet for reporting an entity's assets, liabilities, and shareholder equities at a specific point in time. The balance sheet is a measure of an entity's worth. For assets, the balance sheet includes cash, securities, accounts receivable, inventory, prepaid expenses, collateral deposit, lender deposit, loan principal, interest payments, insurance premiums, admin fees, etc. For liabilities, the balance sheet may include accounts payable, including security interests on borrower collateral, borrower coupon, borrower principal, investor principal, investor yield as well as potential asset claims of counterparties such as principal guarantor, rate guarantor, yield guarantor, foreign exchange guarantor, placement, and underwriting and brokerage services; taxes payable; and accrued expenses. For shareholder equities, the balance sheet may include common stock, earnings, etc. In addition, the balance sheet may convey, implicitly or explicitly, the priority of security interests among creditors on assets tracked by the balance sheet, such as the seniority of debt-holder over shareholder claims on balance sheet assets in the event of business insolvency.

Input string 304 may represent a balance sheet entry for assets and liabilities. Further, the input string 304 may specify conditions under which the stated balance sheet entry is allowed. For instance, example input string 402 in FIG. 4 illustrates a borrower's collateral deposit before a predetermined start time, an entry which is considered a liability to the borrower if the borrower satisfies all conditions imposed on the borrower. The smart contract compiler 302 sets the conditions of a balance sheet, such as detailing the obligations required to be met by debtors versus the allowance that creditors can take. The smart contract compiler 302 defines the security interests of borrowers, investors, insurers, etc who can also claim assets once respective entry obligations toward the balance sheet are fulfilled.

In an example embodiment, person A gives person B an X amount of principal; in return, person B posts collateral as a security for the amount received. These two entries can be entered as DSL as in example input string 402, 404, 406, 408, 410, or 412. The user borrower can initiate these transactions using a client device 130 subject to the conditions imposed on those input strings 304. The user borrower (person A) can propose depositing collateral, of a specific type, as in the smart contract request in the example input string 402. The user borrower has an obligation to pay the lender a principal amount seen in the smart contract request in example input string 404 and interest as in the smart contract request in example input string 406. Person B receives, on a client device 130 e.g. client devices 130-3 and 130-4 for user lender, the principal in smart contract request in example input string 408 and the interest in smart contract request in example input string 410.

Consequently, a smart contract can be broken into multiple conditional smart contract requests. For instance, another example input string 412 may allow person B to claim the collateral, precisely a value of interest plus principal from the collateral, if the conditions of paying principal in example input string 404 and interest in example input string 406 are not met.

Processing input strings 304 on-chain makes both agreement upgrades and the respective transaction recorded on-chain transparent to all parties; thus, the due diligence for agreement condition upgrades becomes almost automated and recorded as an obligation or allowance on the agreement contract balance sheet. Further, such transactions become immutable records on the blockchain; thus, the entered agreement conditions and associated data cannot be altered or removed. In addition, the transparency of agreement upgrades occurs immediately upon submission of a smart contract request. With a transparent balance sheet along with existing obligations and allowances also recorded on-chain, parties to an agreement can perform immediate audits of the agreement smart contract and its updates to validate agreement condition upgrades with respect to their existing security interests in the agreement. As such, the existing agreement conditions of an agreement contract can be upgraded by providing another input string 304, similar to a signed addendum placed on a legal financial contract. The upgrade can be performed since the conditions are not hardcoded; instead, conditions are broken down into segments, and smart contracts representing the conditions are called, making conditions immutable and transparent despite not being hardcoded.

In example embodiments, agreement conditions of the smart contract can be upgraded by sending from the client device 130 an input string 304 in the form of DSL. The sent input string 304 can have desired agreement conditions. Further, the sent input string may also update the capital stack of the contract, which involves layers of capital that go into the entity's operations and balance sheet. The capital stack outlines seniorities as to who is entitled to make claims and receive income, profits or assets generated by the entity and under what conditions. In some embodiments, the seniorities can be wholly or partly determined by the collection of obligations and allowances recorded on-chain across all agreement conditions. The capital stack may comprise debt and equity tiers (known as tranches to practitioners skilled in the art) based on varying levels of risk and priority of the funds or assets used in the smart contract request. Further, the capital stack defines which signatory can claim collaterals or other and in what order of priority or amount in case of defaults or other risk conditions.

A person skilled in the art understands the capital stack, and that senior debt is at the bottom of the capital stack in terms of its governance but holds the strongest priority in terms of asset claims. In other words, the most senior debt is entitled to make claims first and get paid first. On the other hand, common equity is another capital stack layer at the top of the capital stack; hence, common equity has the lowest priority on asset claims and thus would have a junior status relative to senior debt, making common equity the least eligible to make claims, particularly in the event of financial losses or insolvency. On the other hand, common equity may have certain conditional allowances in the event of meeting or surpassing entity performance milestones, such as dividends paid from profits achieved. Other capital stack layers can include the preferred equity, which ranks second after the common equity, then mezzanine debt, which ranks third after common equity. Depending on the complexity of the capital stack balance sheet, there may be other implicit or explicit groupings of stakeholders, based on, for example, priorities determined by the categories of obligations and allowances. These complexities need not be pre-determined at the founding of the entity. Instead, the obligations and allowances encompassing the capital stack agreement can be composed and built iteratively and piecemeal, adapting to new complexities as they arise for the entity. As such, the smart contract compiler 302 and compiler method 700 allows a capital stack agreement smart contract to scale well beyond a blockchain's limits for maximum smart contract size compared to if the same agreement conditions were to be hardcoded.

Example embodiments can use the described compiler method 700 in an Enterprise Resource Planning (ERP) in automating business processes. ERP may include a general ledger, accounts payable, accounts receivable, a payroll, operational data streams and financial reporting, some of which can be achieved using the compiler method 700 described above. Other example embodiments may include trusted risk probability scoring, such as regulated credit scoring whose decision models and decision outputs are subject to regulation compliance by financial supervisory bodies. In such examples, the compiler method 700 and smart contract compiler 302 can be used to piecewise build a tree of transparent conditions (e.g. recursive) in smart contract form, where multiple smart contract-encoded conditions are interlinked into a decision tree with an oracle providing data, such as a credit report, into the decision tree, and where the decision tree returns a decision result, such as accept or reject, with both the decision tree and its outputs transparent on the blockchain to users and interested observers, such as financial regulators.

Further example embodiments may include issuance of blockchain digital tokens, which require absolute immutability of the originally deployed smart contract maintaining the registry of token owners and balances. In the art, such tokens are called bearer instruments, in that ownership belongs to the individual or entity who bears the asset with full control and responsibility over its transfer to another owner without requiring an intermediary agent. Once a smart contract is deployed for a blockchain digital token, that contract cannot be replaced by another contract without degrading user trust, which in-turn can deplete the token's value or utility. However, some bearer tokens, such as cryptocurrencies, may benefit from recurring governance upgrades by a governing network to regulate the token's creation, destruction, utility or economy. For such applications, the smart contract compiler 302 via compiler method 700 can be used to build a bearer instrument whose utility, supply and incentivization functions can be upgraded, but not its bearer property. In such embodiments, an agreement smart contract for the token might contain the minimal amount of hardcoding required to maintain bearer property a permanent untamperable feature of the token, but allow upgrading of other conditional functionality through smart contract compiler 302 via compiler method 700 as deemed required by a governing body to adjust the token's utility or liquidity.

Further example embodiments may include process automation of compliance audits, where the smart contract compiler 302 via compiler method 700 can be used to create and maintain a service agreement with conditions representing rulesets for a compliance audit attestation. For those skilled in the art, such compliance audit workflows require immutable but upgradeable rulesets which are transparent to all audit participants and observers. In these example embodiments, a supervisory or auditing entity may provide input strings similar to example input strings 402, 404, 406, 408, 410, 412 in FIG. 4 to define signed on-chain obligations using the compiler method 700. In such embodiments, an upgradeable audit service smart contract agreement will contain agreement conditions which entail obligations of the audited party to satisfy a set of audit conditionals based on agreed upon rule sets and audit data oracles (such as an audited entity's ERP data). Accordingly, the on-chain satisfaction of agreement conditions by the audited entity triggers an on-chain transaction representing an attestation of satisfactory audit results by the supervisory or auditing entity, or alternatively an attestation of a failed audit with on-chain transparency of the failed audit conditions. In some embodiments, the compliance audit agreement may audit transactions or upgrades of another smart contract representing a capital stack agreement among parties. Accordingly, the compliance audit agreement may evaluate observed versus expected values of another capital stack agreement, flagging any financial or contractual discrepancies accordingly.

Figure 8:
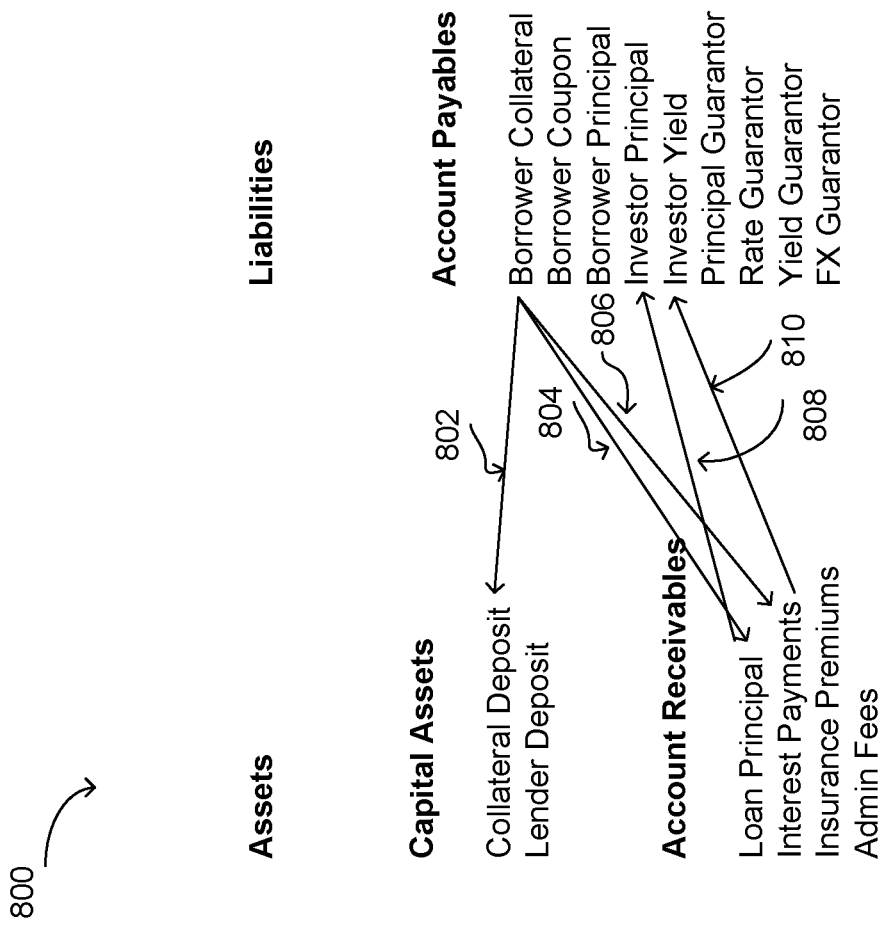
FIG. 8 is a hypothetical loan smart contract illustrating balance sheet entries in accordance with an example embodiment.

FIG. 8 is a hypothetical loan smart contract 800 illustrating balance sheet entries. The loan smart contract 800 maintains implicit balance sheet information and relies on example input strings 402, 404, 406, 408, 410, and 410 in FIG. 4 to create agreement conditions for the loan using the smart contract compiler 302 via compiler method 700. Sending an example input string 402, a DSL format, by a user borrower from a client device 130 (e.g. client device 130-1 or client device 130-2 of a user borrower) to nodes 120 is recorded in nodes 120 and shown in the balance sheet as balance sheet entry 802. Similarly, sending an example input string 404 and example input string 406, in a DSL format, by a user borrower from a client device 130 (e.g. client device 130-1 or client device 130-2 of a user borrower) to nodes 120 is recorded in nodes 120 and shown in the balance sheet as balance sheet entry 804 and 806, respectively.

Upon sending example input strings 404 and 406 by the user borrower from client device 130-1 or client device 130-2, produces pending balance sheets entries against the balance sheet. The pending balance sheets entries are not recorded in nodes 120 (e.g. the balance sheet) until the conditions of example input strings 404 and 406 are satisfied and executed accordingly by the EVM. Once conditions of the example input strings are satisfied, effective double entries are created, one for the lender and one for the borrower, changing asset and liability balances in the capital stack. The example input string 404 may be recorded in the balance sheet as balance sheet entry 808 and example input string 406 may be recorded in the balance sheet as balance sheet entry 810.

Figure 9:
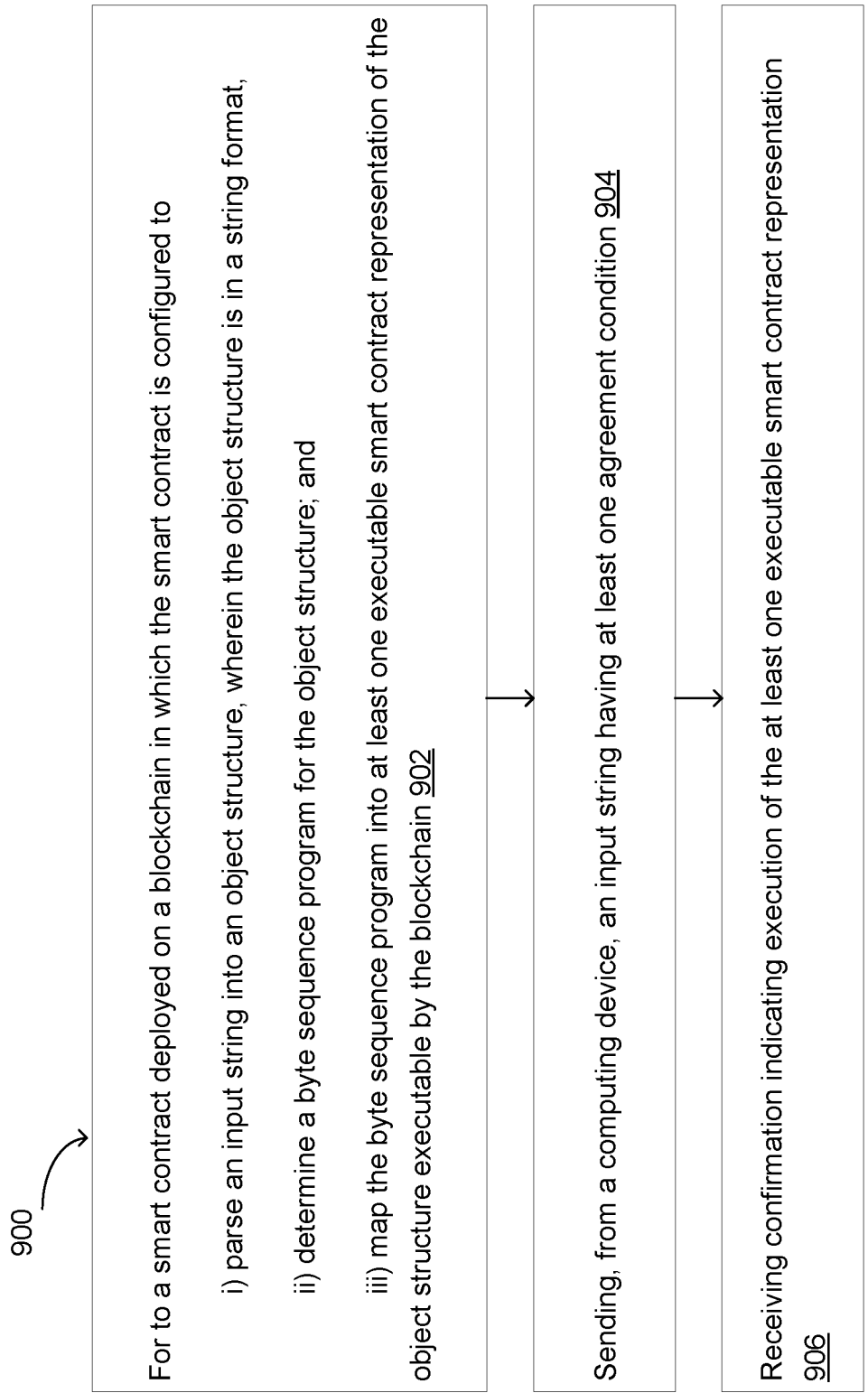
FIG. 9 is a flowchart of a method for a computing device sending an input string to the smart contract in accordance with an example embodiment.

FIG. 9 is a flowchart of a method 900 for computing device sending an input string to the smart contract in accordance with an example embodiment. The method 900 begins at step 902, at which there is a smart contract compiler 302 deployed on a blockchain. The smart contract compiler 302 of FIG. 9 may be configured as in method 700 in FIG. 7 to parse an input string into 304 an object structure, wherein the object structure is in a string format. Further, the smart contract compiler 302 may determine a byte sequence program for the object structure; and map the byte sequence program into at least one executable smart contract representation of the object structure executable by the blockchain. This smart contract compiler 302 is accessible by a client device 130, connected to nodes 120 of the blockchain. Step 902 ends and step 904 begins.

At step 904, the client device 130 sends an input string having at least one agreement condition. The input string is for a smart contract request (e.g. contract's clause, term, or instruction), such as example input strings 402, 404, 406, 408, 410, and 412. When the at least one agreement condition is satisfied, the at least one executable smart contract representation is executed and the blockchain transaction, which updates the ledger, is recorded on the blockchain.

At step 906, the client may receive in the computing device or another computing device a confirmation indicating the input string has been sent, or the executable smart contract representation has been executed, or both. Further, due to the nature of blockchain, the client can check whether the input string has been processed or the executable smart contract representation has been executed since the processing and the execution will be recorded on the blockchain. Therefore, the capability to check the recorded blockchain transactions is also a form of confirmation that the client has successfully sent an input string or the executable smart contract has been executed.

It is to be understood by a person skilled in the art that while the embodiments were taught for Ethereum blockchain and Solidity™, Ethereum and Solidity™ are not meant to be limitations but examples. The aforementioned embodiments may be equally applicable to other blockchains such as Solana and Cardano, and other blockchains, instead of Ethereum. Further, programming languages other than Solidity™ may be used, including, Vyper™, Yup™, Python™, Rust™, Haskell™, JavaScript™, DAML™.

The various example embodiments of the systems, devices and/or processes are described using block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. However, those skilled in the art will recognize that the example embodiments, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings herein.

The described methods may be carried out by modules, routines, or subroutines of software executed by the node computing device 200. Coding of software for carrying out the steps of the methods is well within the scope of a person of ordinary skill in the art having regard to the methods of compiling smart contracts. The compiler method 700 for compiling a smart contract may contain additional or fewer steps than shown and described, and the steps may be performed in a different order. Computer-readable instructions, executable by the processor(s) of the node computing device 200, may be stored in the memory 210 of the node computing device 200 or a computer-readable medium. It is to be emphasized that the steps for compiling a smart contract need not be performed in the exact sequence as shown unless otherwise indicated. Likewise, various steps of the methods may be performed in parallel rather than in sequence.

It can be appreciated that the compiler method 700, once implemented, can be performed by the node computing device 200 in a fully automatic manner, which is convenient for users to use as no manual interaction is needed.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the described systems and methods may be implemented in other manners. For example, the described system embodiments are merely examples. Further, units or components may be combined or integrated into another system, or some features may be ignored or not performed. In addition, the displayed or discussed mutual couplings or direct couplings or communication connections may be implemented by using some interfaces. The indirect couplings or communication connections between the systems or units may be implemented in electronic, mechanical, or other forms.

The example embodiments may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of the example embodiments.

Also, although the example systems, devices and processes for compiling a smart contract herein may comprise a specific number of elements/components, the systems, devices, and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one node computing device 200, or each of the units may exist alone physically, or two or more units are integrated into one unit.

When the functions are implemented in the form of a software functional unit and sold or used as an independent product, they may be stored in a storage medium and include several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations but are not intended to limit the scope of protection. Any variation or replacement readily figured out by a person skilled in the art within the technical scope shall fall within the scope of protection. Therefore, the scope of protection shall be subject to the protection scope of the claims.

The invention claimed is:

1. A compiler method for a smart contract, the method comprising:
by the smart contract deployed on a blockchain:
receiving an input string having at least one agreement condition and at least one action;
accepting the input string;
parsing, using a parser, the input string into an object structure, wherein the object structure is in a string format;
determining a byte sequence program for the object structure, wherein the byte sequence program is an ordered sequence of bytecodes for executing the at least one agreement condition and the at least one action;
mapping the byte sequence program into at least one executable smart contract representation of the object structure executable by the blockchain, wherein the at least one executable smart contract representation implements at least one function of a programming language, wherein in response to receiving a request for executing the at least one function of the programming language, the at least one executable smart contract representation for the at least one function is executed and the at least one action is performed;
receiving, from a computing device, a second input string for updating a segment of at least one of the agreement conditions;
parsing, using the parser, the second input string into a second object structure comprising the segment;
determining a second byte sequence program for the second object structure;
updating the byte sequence program with the second byte sequence program;
evaluating the at least one executable smart contract representation in response to the at least one agreement condition being satisfied; and
sending, to the computing device or another computing device, confirmation of execution of the at least one smart contract representation.

2. The compiler method of claim 1, wherein the segment is a segment of a function.

3. The compiler method of claim 1, wherein the at least one executable smart contract representation implements native functions or native operations.

4. The compiler method of claim 3, wherein the native functions or the native operations include:
one or more binary comparators including at least one of equal, not equal, greater than or less than;
one or more set operations including at least one of logical AND, logical OR, COUNT, or SUM;
one or more compositional operators including at least one of plus, minus, multiplication, or division; or
one or more loops including while-loops, for-loops, counters, if-statements, switch statements.

5. The compiler method of claim 3, wherein the at least one executable smart contract representation implements a data source function including at least one of logical TRUE, logical FALSE, or a read-only variable.

6. The compiler method of claim 1, wherein the object structure is a nested tree, each leaf of the nested tree being another object structure.

7. The compiler method of claim 1, wherein the input string is in a recursive data structure.

8. The compiler method of claim 7, wherein the accepting of the input string is based on the computing device or a user providing the input string having permission to provide the input string.

9. The compiler method of claim 7, wherein the recursive data structure is a domain-specific language.

10. The compiler method of claim 1, wherein the at least one executable smart contract representation is executable by an Ethereum Virtual Machine (EVM) of the blockchain.

11. The compiler method of claim 1, wherein the receiving the second input string, the parsing the second input string, and the determining the second byte sequence program is performed by a master smart contract which is the smart contract deployed on the blockchain.

12. The compiler method of claim 1, wherein the updating of the byte sequence program is updated exclusive of any other segments and any other agreement conditions.

13. The compiler method of claim 1, wherein the second string input is for further updating an amount of at least one of the actions.

14. The compiler method of claim 1, wherein the second string input is for further updating one or more further segments of at least one of the agreement conditions.

15. The compiler method of claim 1, wherein the input string, the object structure, and the byte sequence program represent a workflow is an ordered sequence.

16. The compiler method of claim 1, wherein the receiving the second input string is performed after the mapping.

17. A computer-readable medium having tangibly stored thereon computer-executable instructions that, in response to execution by a processor, cause a smart contract of the processor deployed on a blockchain to:
- receive an input string having at least one agreement condition and at least one action;
- accept the input string;
- parse, using a parser, the input string into an object structure, wherein the object structure is in a string format;
- determine a byte sequence program for the object structure, wherein the byte sequence program is an ordered sequence of bytecodes for executing the at least one agreement condition and the at least one action;
- map the byte sequence program into at least one executable smart contract representation of the object structure executable by the blockchain, wherein the at least one executable smart contract representation implements at least one function of a programming language, wherein in response to receiving a request for executing the at least one function of the programming language, the at least one executable smart contract representation for the at least one function is executed and the at least one action is performed;
- receive, from a computing device, a second input string for updating a segment of at least one of the agreement conditions;
- parse, using the parser, the second input string into a second object structure comprising the segment;
- determine a second byte sequence program for the second object structure;
- update the byte sequence program with the second byte sequence program;
- evaluate the at least one executable smart contract representation in response to the at least one agreement condition being satisfied; and
- send, to the computing device or another computing device, confirmation of execution of the at least one smart contract representation.

* * * * *